United States Patent
Kumar

(10) Patent No.: US 10,304,188 B1
(45) Date of Patent: May 28, 2019

(54) APPARATUS AND METHOD FOR AUTOMATED CELL ANALYSIS

(71) Applicant: Caleb J. Kumar, Minneapolis, MN (US)

(72) Inventor: Caleb J. Kumar, Minneapolis, MN (US)

(*) Notice: Subject to any disclaimer, the term of this patent is extended or adjusted under 35 U.S.C. 154(b) by 223 days.

(21) Appl. No.: 15/001,233

(22) Filed: Jan. 19, 2016

Related U.S. Application Data

(60) Provisional application No. 62/139,584, filed on Mar. 27, 2015.

(51) Int. Cl.
  *G06K 9/00* (2006.01)
  *G06T 7/00* (2017.01)
  *G06T 7/40* (2017.01)

(52) U.S. Cl.
  CPC .......... *G06T 7/0014* (2013.01); *G06K 9/0014* (2013.01); *G06K 9/00127* (2013.01); *G06T 7/408* (2013.01); *G06T 2207/10056* (2013.01); *G06T 2207/30024* (2013.01)

(58) Field of Classification Search
  CPC ......... G06T 7/0012; G06T 2207/30024; G06T 2207/10056; G06T 2207/10024; G06T 2207/30004; G06T 7/90; G06T 7/11; G06T 7/136; G06T 7/12; G06T 7/194; G06T 5/40; G06T 2207/30242; G06K 9/00127; G06K 9/0014; G06K 9/4652; G01N 15/1475
  See application file for complete search history.

(56) References Cited

U.S. PATENT DOCUMENTS

| | | | |
|---|---|---|---|
| 4,359,527 A | 11/1982 | Zetter | |
| 4,447,545 A | 5/1984 | DeFazio et al. | |
| 4,965,725 A | 10/1990 | Rutenberg | |
| 5,260,871 A | 11/1993 | Goldberg | |
| 5,264,343 A | 11/1993 | Krystosek et al. | |
| 5,301,681 A | 4/1994 | DeBan et al. | |
| 5,412,665 A | 5/1995 | Gruodis et al. | |
| 5,677,966 A | 10/1997 | Doerrer et al. | |
| 5,733,721 A | 3/1998 | Hemstreet, III et al. | |
| 5,768,412 A * | 6/1998 | Mitsuyama | G06K 9/00127 382/133 |

(Continued)

OTHER PUBLICATIONS

Mu et al., Segmentation, Reconstruction, and Analysis of Blood Thrombus Formation in 3D 2-Photon Microscopy Images,Sep. 6, 2009:1st on-line[retrieved Jun. 29, 2018], EURASIP Journal on Advances in Signal Processing, vol. 2010,pp. 1-8. Retrieved from the Internet: https://link.springer.com/article/10.1155/2010/147216.*

(Continued)

*Primary Examiner* — Andrew M Moyer
*Assistant Examiner* — Dennis Rosario
(74) *Attorney, Agent, or Firm* — Charles A. Lemaire; Jonathan M. Rixen; Lemaire Patent Law Firm, P.L.L.C.

(57) ABSTRACT

A system and method for automatically analyzing an image of cells to detect cancer. Some embodiments include eliciting and receiving a digital photomicrograph image of cells; determining a boundary of a cell in the image; identifying a plurality of characteristics of the cell from image-pixel data from within the identified boundary of the cell; reading a plurality of cell characteristics of a plurality of types of cells from a database; comparing the identified characteristics of the cells in the image to the plurality of cell characteristics read from the database; and determining a pathology based on the comparing. Some embodiments further include automatically identifying an appropriate treatment and applying the identified treatment.

21 Claims, 11 Drawing Sheets

(56) References Cited

U.S. PATENT DOCUMENTS

| | | | |
|---|---|---|---|
| 5,983,211 A | 11/1999 | Heseltine et al. | |
| 6,004,821 A * | 12/1999 | Levine | B01L 3/5027 422/504 |
| 6,125,194 A | 9/2000 | Yeh et al. | |
| 6,284,482 B1 | 9/2001 | Eisen et al. | |
| 6,463,438 B1 | 10/2002 | Veltri et al. | |
| 6,553,356 B1 | 4/2003 | Good et al. | |
| 6,956,961 B2 * | 10/2005 | Cong | G01N 15/14 382/133 |
| 6,962,789 B2 | 11/2005 | Bacus | |
| 6,993,175 B2 * | 1/2006 | Samoszuk | A61B 5/0059 128/922 |
| 6,996,549 B2 | 2/2006 | Zhang et al. | |
| 7,027,633 B2 * | 4/2006 | Foran | G06F 19/321 128/920 |
| 7,155,050 B1 | 12/2006 | Sloge et al. | |
| 7,760,927 B2 | 7/2010 | Gholap et al. | |
| 7,801,361 B2 * | 9/2010 | Binnig | G06K 9/00127 382/158 |
| 7,936,913 B2 * | 5/2011 | Nordell | G06F 19/321 382/128 |
| 7,979,212 B2 | 7/2011 | Gholap et al. | |
| 8,064,679 B2 | 11/2011 | Griffin | |
| 8,350,905 B2 * | 1/2013 | Yamada | G01N 21/6458 250/306 |
| 8,642,349 B1 | 2/2014 | Yeatman et al. | |
| 8,644,582 B2 | 2/2014 | Yoshihara et al. | |
| 9,239,281 B2 * | 1/2016 | Manri | G01N 15/147 |
| 2002/0001586 A1 | 1/2002 | Liau | |
| 2004/0043436 A1 | 3/2004 | Vlahou et al. | |
| 2004/0241677 A1 * | 12/2004 | Lin | G01N 15/1475 435/6.11 |
| 2006/0036372 A1 | 2/2006 | Yener et al. | |
| 2006/0084125 A1 | 4/2006 | Laor | |
| 2007/0036434 A1 * | 2/2007 | Saveliev | G06K 9/52 382/173 |
| 2007/0099207 A1 | 5/2007 | Fuchs et al. | |
| 2008/0166035 A1 | 7/2008 | Qian et al. | |
| 2009/0252728 A1 | 10/2009 | Jakobovits et al. | |
| 2009/0317836 A1 | 12/2009 | Kuhn et al. | |
| 2009/0326359 A1 | 12/2009 | Hendriks et al. | |
| 2010/0086932 A1 | 4/2010 | Asensio et al. | |
| 2010/0111396 A1 | 5/2010 | Boucheron | |
| 2010/0119128 A1 | 5/2010 | Zhang et al. | |
| 2010/0128950 A1 | 5/2010 | Woods et al. | |
| 2010/0172568 A1 | 7/2010 | Malon et al. | |
| 2010/0323903 A1 | 12/2010 | Rosenwald et al. | |
| 2011/0081087 A1 | 4/2011 | Moore | |
| 2011/0282819 A1 | 11/2011 | Ball et al. | |
| 2012/0052063 A1 | 3/2012 | Bhargava et al. | |
| 2012/0082362 A1 | 4/2012 | Diem et al. | |
| 2012/0177280 A1 | 7/2012 | Zhukov et al. | |
| 2013/0071876 A1 | 3/2013 | Hao et al. | |
| 2013/0094750 A1 * | 4/2013 | Tasdizen | G06K 9/0014 382/134 |
| 2013/0182936 A1 * | 7/2013 | Yoshihara | G06T 7/0012 382/133 |
| 2014/0080731 A1 | 3/2014 | Davicioni et al. | |
| 2014/0139625 A1 | 5/2014 | Mathuis et al. | |

OTHER PUBLICATIONS

Savkare et al., Automatic Detection of Malaria Parasites for Estimating Parasitemia, 2011 [retrieved Mar 8, 2019], International Journal Computer Science and Security, vol. 5, Issue 3, pp. 310-315. Retrieved: http://www.cscjournals.org/manuscript/Journals/IJCSS/Volume5/Issue3/IJCSS-480.pdf (Year: 2011).*

Sobel, "An Isotropic 3 3 Image Gradient Operator—History and Definition of the so-called 'Sobel Operator', more appropriately named the Sobel-Feldman Operator", "downloaded internet page: www.researchgate.net/publication/239398674_An_Isotropic_3_3_Image_Gradient_Operator", Feb. 2014.

Ahmed, et al., "A Modified Fuzzy C-Means Algorithm for Bias Field Estimation and Segmentation of MRI Data", Mar. 2002, pp. 193-199, vol. 21, No. 3, Publisher: IEEE Transactions on Medical Imaging , Published in: A Modified Fuzzy C-Means Algorithm for Bias Field Estimation and Segmentation of MRI Data.

Ballard, D.H., "Generalizing the Hough Transform to Detect Arbitrary Shapes", "Pattern Recognition", 1981, pp. 183-194, vol. 13, No. 2.

Bhatia, et al., "Malignant Atypical Cell in Urine Cytology: A Diagnostic Dilemma", Dec, 2006, vol. 3, No. 28, Publisher: CytoJournal—downloaded from: http://citeseerx.ist.psu.edu/viewdoc/download?doi=10.1.1.279.597&rep=rep1&type=pdf.

Blockeel, et al., "Efficient Algorithm for Decision Tree Cross-validation.", Dec. 2, 2002, pp. 621-650, vol. 3, Publisher: Journal of Machine Learning Research.

Canny, "Pattern Analysis and Machine Intelligence", Nov. 1986, pp. 679-698, vol. 8, No. 6.

Chernov, et al., "Least squares fitting of circles", "Journal of Mathematical Imaging and Vision", Nov. 2005, pp. 239-252, vol. 23, No. 3.

Deng, et al., "An adaptive Gaussian filter for noise reduction and edge detection", Oct. 1993, Publisher: Nuclear Science Symposium and Medical Imaging Conference, 1993. 1993 IEEE Conference Record.

Fleiss, et al., "The equivalence of weighted Kappa and the intraclass correlation coefficient as measures of reliability", Oct. 1973, pp. 613-619, vol. 33 , Publisher: Educational and Psychological Measurement.

Kanopoulos, et al., "Design of an image edge detection filter using the Sobel operator", "Solid-State Circuits, IEEE Journal of", Apr. 1988, pp. 358-367, vol. 23, No. 2.

Kasa, I., "A circle fitting procedure and its error analysis", "IEEE Trans. Inst. Meas.", Mar. 1976, pp. 8-14, vol. 25.

Kim, et al., "Epigenetic Markers for Bladder Cancer in Urine", 2007, pp. 35-42, vol. 2, Publisher: Translational Oncogenomics.

Moallemi, "Classifying Cells for Cancer Diagnosis Using Neural Networks", Dec. 1991, pp. 8-12, vol. 6, No. 6, Publisher: IEEE Intelligent System.

Pratt, "Direct least-squares fitting of algebraic surfaces", Apr. 30, 1987, pp. 145-152, vol. 21 , Publisher: Computer Graphics.

"Improved algebraic methods for circle fitting.", "Electronic Journal of Statistics", Sep. 2009, pp. 1075-1082, vol. 3.

Talbott, et al., "Characterization of Light Emitting Diodes (LEDs) and Compact Fluorescent Lamps (CFLs) by UV-Visible Spectrophotometry", "available at, and downloaded from internet page: www.ssi.shimadzu.com/products/literature/uv/VIS/SSI-Pittcon12-UV-001.pdf", 2012, Publisher: Shimadzu Scientific Instruments.

Taubin, "Estimation of Planar Curves, Surfaces and Nonplanar Space Curves Defined by Implicit Equations, With Applications to Edge and Range Image Segmentation", "IEEE Trans. PAMI", Nov. 1991, pp. 1115-1138, vol. 13.

Umbach, et al., "A few methods for fitting circles to data", Dec. 2003 , pp. 1881-1885, vol. 52, No. 6, Publisher: Instrumentation and Measurement, IEEE Transactions on.

* cited by examiner $$d_1(\mathbf{A}, \mathbf{B}) = \sum_{i=1}^{n} \sum_{j=1}^{n} |a_{ij} - b_{ij}|$$

$$d_2(\mathbf{A}, \mathbf{B}) = \sqrt{\sum_{i=1}^{n} \sum_{j=1}^{n} (a_{ij} - b_{ij})^2}$$

$$d_\infty(\mathbf{A}, \mathbf{B}) = \max_{1 \leq i \leq n} \max_{1 \leq j \leq n} |a_{ij} - b_{ij}|$$

$$d_m(\mathbf{A}, \mathbf{B}) = \max\{\|(\mathbf{A} - \mathbf{B})\mathbf{x}\| : \mathbf{x} \in \mathbb{R}^n, \|\mathbf{x}\| = 1\}$$

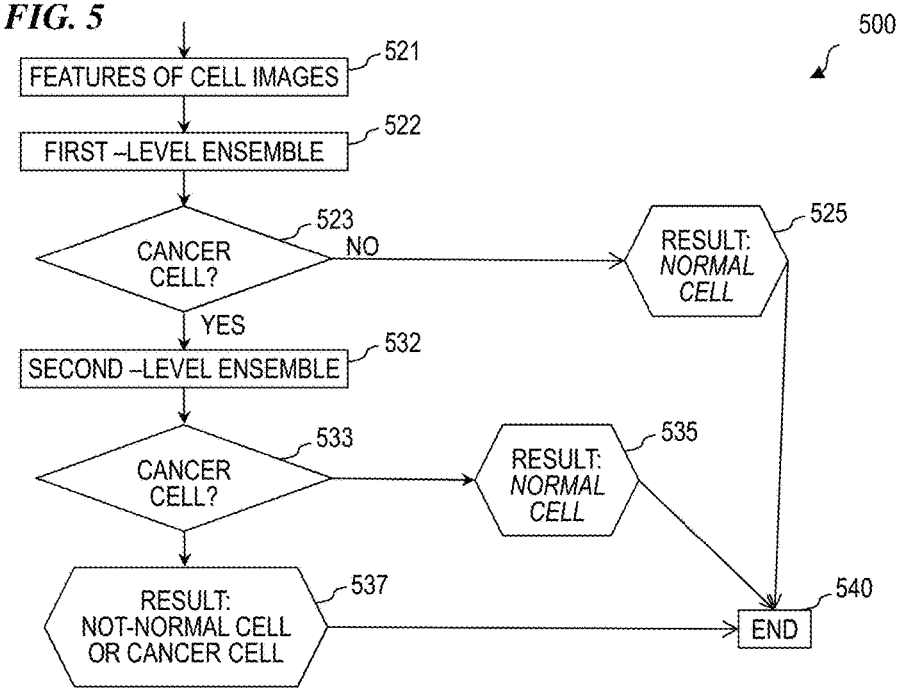
FIG. 5
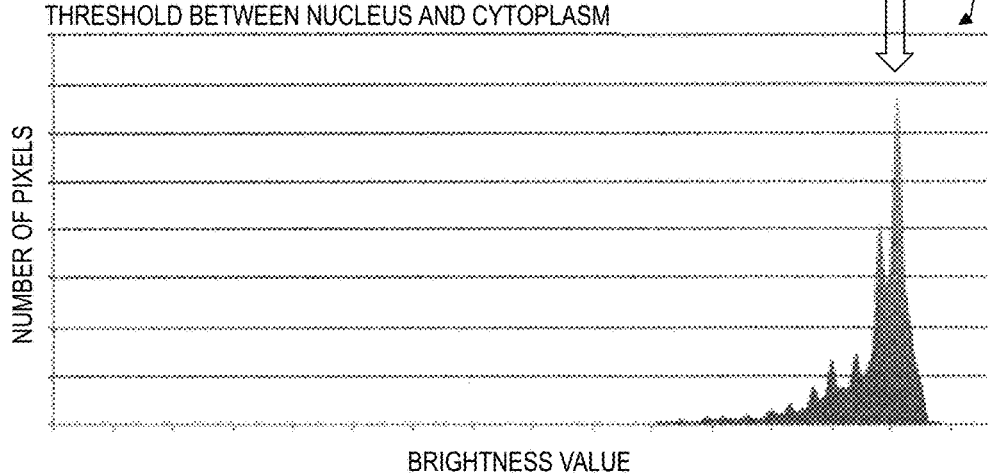
FIG. 6  EXAMPLE GRAPH USED TO CALCULATE THRESHOLD BETWEEN NUCLEUS AND CYTOPLASM
FIG. 7  NUCLEUS-TO-CYTOPLASM RATIO FORMULA
$$\frac{\Sigma \text{ PIXELS CONTAINED BY NUCLEUS}}{\Sigma \text{ PIXELS CONTAINED BY BACKGROUND} - \Sigma \text{ PIXELS CONTAINED BY NUCLEUS}}$$

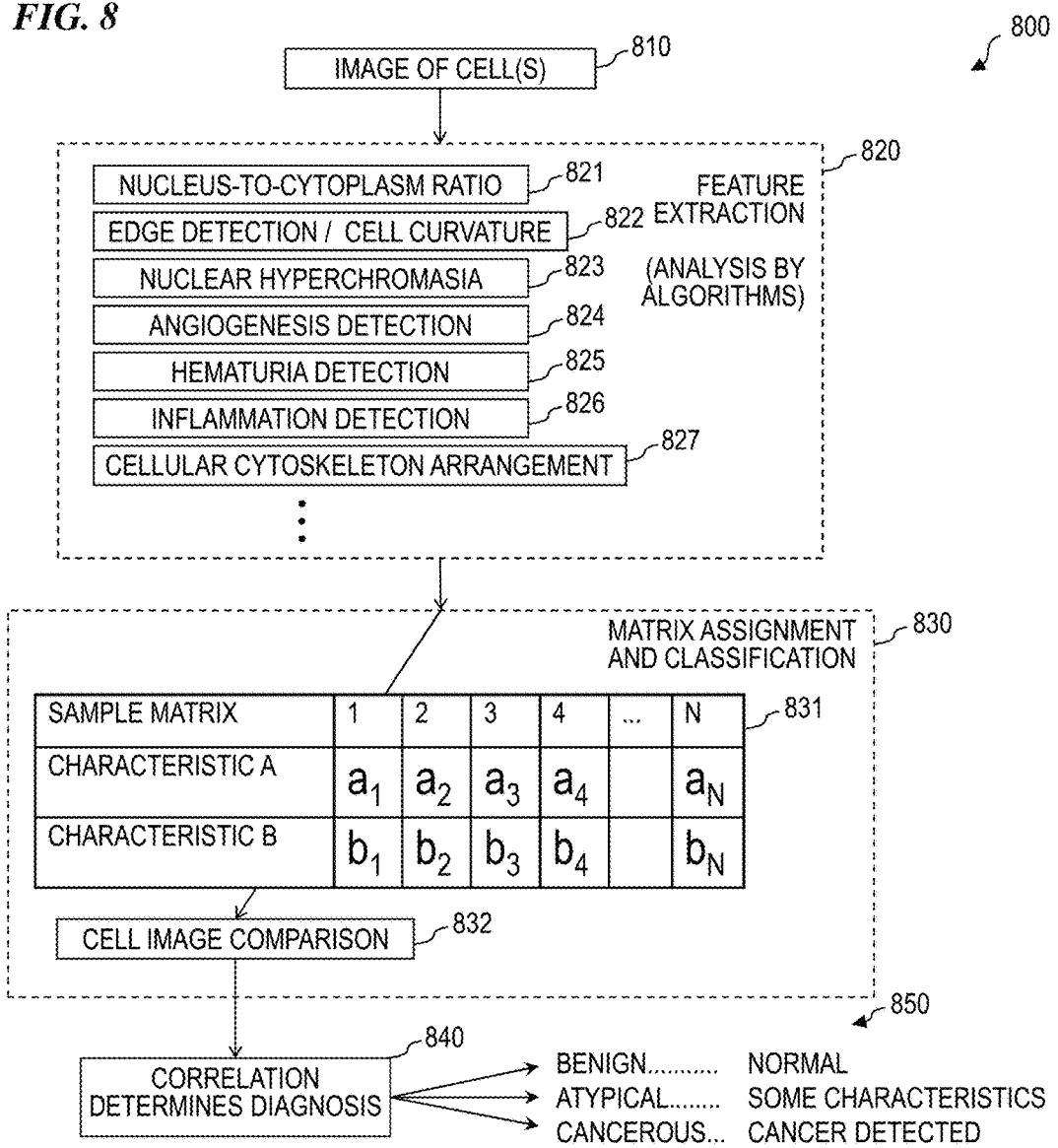

*FIG. 9*
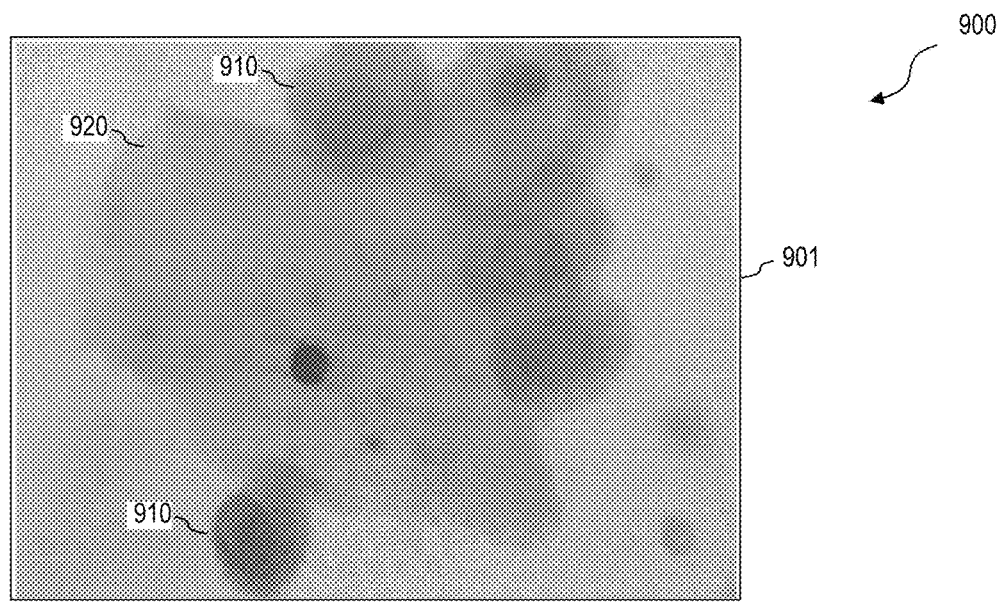
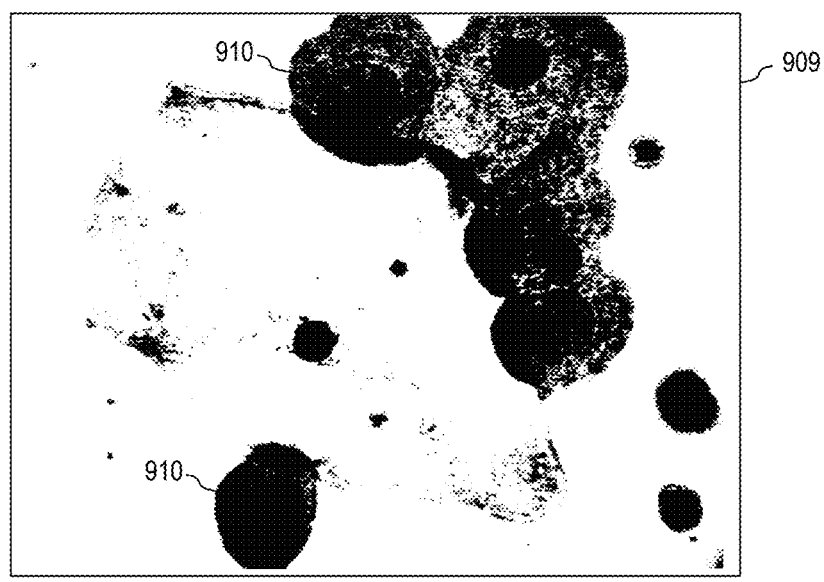

*FIG. 10*

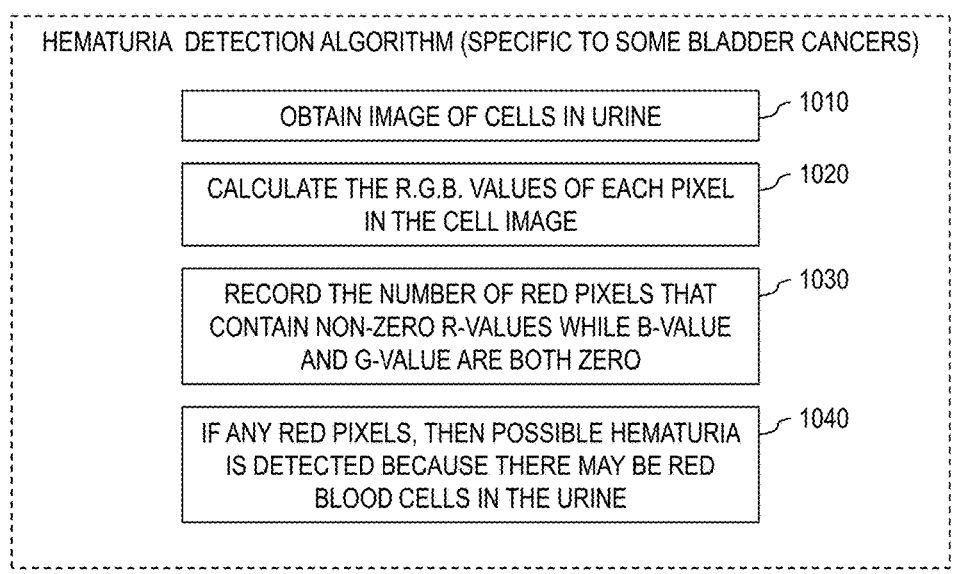

HEMATURIA DETECTION ALGORITHM (SPECIFIC TO SOME BLADDER CANCERS)
- 1010: OBTAIN IMAGE OF CELLS IN URINE
- 1020: CALCULATE THE R.G.B. VALUES OF EACH PIXEL IN THE CELL IMAGE
- 1030: RECORD THE NUMBER OF RED PIXELS THAT CONTAIN NON-ZERO R-VALUES WHILE B-VALUE AND G-VALUE ARE BOTH ZERO
- 1040: IF ANY RED PIXELS, THEN POSSIBLE HEMATURIA IS DETECTED BECAUSE THERE MAY BE RED BLOOD CELLS IN THE URINE

*FIG. 11*

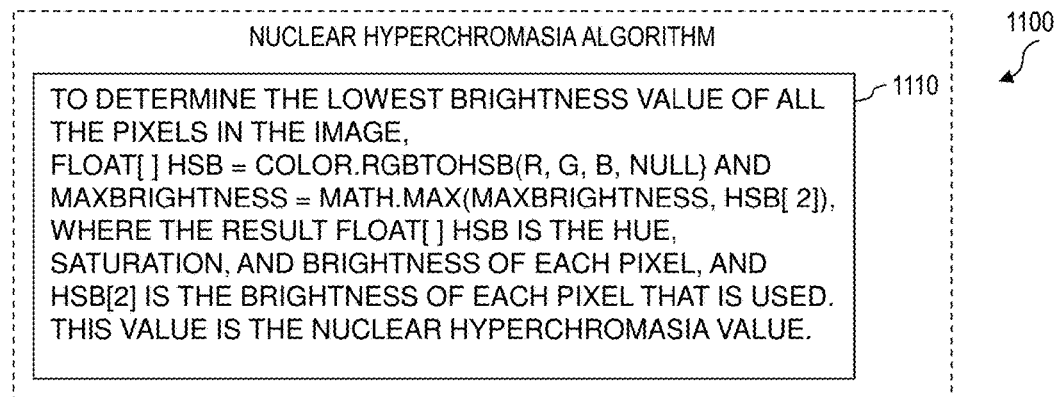

NUCLEAR HYPERCHROMASIA ALGORITHM

1110: TO DETERMINE THE LOWEST BRIGHTNESS VALUE OF ALL THE PIXELS IN THE IMAGE,
FLOAT[ ] HSB = COLOR.RGBTOHSB(R, G, B, NULL) AND MAXBRIGHTNESS = MATH.MAX(MAXBRIGHTNESS, HSB[ 2]), WHERE THE RESULT FLOAT[ ] HSB IS THE HUE, SATURATION, AND BRIGHTNESS OF EACH PIXEL, AND HSB[2] IS THE BRIGHTNESS OF EACH PIXEL THAT IS USED. THIS VALUE IS THE NUCLEAR HYPERCHROMASIA VALUE.

APPARATUS AND METHOD FOR AUTOMATED CELL ANALYSIS

CROSS-REFERENCE TO RELATED APPLICATION

This application claims priority benefit, under 35 U.S.C. § 119(e), of U.S. Provisional Patent Application No. 62/139,584, filed Mar. 25, 2015 by Caleb J. Kumar, titled "Apparatus and Method for Automated Cell Analysis," which is incorporated herein by reference in its entirety.

FIELD OF THE INVENTION

The present invention relates to the field of the field of medicine, and more specifically, to a computer-aided diagnosis system for analysis of a photomicrograph image and detection and differentiation of normal cells from cancerous cells and other pathological tissue based on the analysis of the image of a specimen, using software pattern recognition.

BACKGROUND OF THE INVENTION

See the attached Appendix 1, which forms part of this application, and which discusses aspects and methods that can be used in some embodiments of the improved invention shown in the attached Figures and described below.

U.S. Pat. No. 4,359,527 to Zetter issued on Nov. 16, 1982 with the title "Cancer diagnostic assay", and is incorporated herein by reference. U.S. Pat. No. 4,359,527 describes an in vitro cancer diagnostic assay that includes providing a substratum coated with a layer of visible particles susceptible to ingestion by capillary endothelial cells, plating such cells onto the substratum, allowing the cells to adhere, incubating the cells with a test sample, measuring the area of the visible particle-depleted phagokinetic track left by at least one of the cells, and comparing that area to the track area left by a control cell, a comparatively larger test track area indicating the presence in the test sample of a factor associated with cancer cells.

U.S. Pat. No. 4,447,545 to DeFazio et al. issued on May 8, 1984 with the title "Bladder cancer detection", and is incorporated herein by reference. U.S. Pat. No. 4,447,545 describes a technique for screening populations to detect potential bladder cancer patients. The screening test is based on a discovered correlation between the respective ratios of C-reactive protein to total protein in urine and serum and the incidence of bladder cancer.

U.S. Pat. No. 4,965,725 to Rutenberg issued on Oct. 23, 1990 with the title "Neural network based automated cytological specimen classification system and method", and is incorporated herein by reference. U.S. Pat. No. 4,965,725 describes an automated screening system and method for cytological specimen classification in which a neural network is utilized in performance of the classification function. Also described is an automated microscope and associated image-processing circuitry.

U.S. Pat. No. 5,677,966 to Doerrer et al. issued on Oct. 14, 1997 with the title "Interactive automated cytology method incorporating both manual and automatic determinations", and is incorporated herein by reference. U.S. Pat. No. 5,677,966 describes an automated interactive cytology system provides expedited handling of samples, minimizing false negatives, while not substantially increasing the number false positives. A computerized system identifies and displays the cells which are of greatest interest to the cytologist. The system then processes this information on all cells identified to classify the slide as normal, abnormal, or questionable based on a statistical analysis of cells meeting given criteria. Before displaying the results of the statistical analysis, a cytologist reviews the cells which the computer has determined to be most significant. It is only then after the cytologist has determined whether the cells are positive, negative, or questionable, that the determination is inputted into the automated system. The automated system then compares the cytologist's analysis with its own statistical analysis. Based on the two opinions, the cytologist determines how to advise a doctor regarding the sample.

U.S. Pat. No. 5,260,871 to Goldberg issued on Nov. 9, 1993 with the title "Method and apparatus for diagnosis of breast tumors", and is incorporated herein by reference. U.S. Pat. No. 5,260,871 describes an apparatus for distinguishing benign from malignant tumors in ultrasonic images of candidate tissue taken from a patient. A region of interest is located and defined on the ultrasonic image, including substantially all of the candidate tissue and excluding substantially all the normal tissue. The region of interest is digitized, generating an array of pixels intensity values. A first features is generated from the arrays of pixels corresponding to the angular second moment of the pixel intensity values. A second feature is generated from the array of pixels corresponding to the inverse contrast of the pixel intensity values. A third feature is generated from the array of pixels corresponding to the short run emphasis of the pixel intensity values. The first, second and third feature values are provided to a neural network. A set of trained weights are applied to the feature values, which generates a network output between 0 and 1, whereby the output values tend toward 1 when the candidate tissue is malignant and the output values tend toward 0 when the candidate tissue is benign.

U.S. Pat. No. 5,264,343 to Krystosek et al. issued on Nov. 23, 1993 with the title "Method for distinguishing normal and cancer cells", and is incorporated herein by reference. U.S. Pat. No. 5,264,343 describes a method of electing the presence or absence of exposed nuclear DNA is described. Cells are reacted with a reaction composition comprising DNA polymerase I, DNase I, and the nucleotides dATP, dCTP, dGTP, and dTTP or dUTP, at least one of said nucleotides being biotin labeled. Biotin labeled nucleotides incorporated in exposed DNA are detected. Also described is a kit useful for detecting the presence or absence of exposed DNA in cells.

U.S. Pat. No. 5,301,681 to DeBan et al. issued on Apr. 12, 1994 with the title "Device for detecting cancerous and precancerous conditions in a breast", and is incorporated herein by reference. This patent describes a device for detecting and monitoring physiological conditions in mammalian tissue, and method for using the same. The device includes sensors for sensing physiological conditions and generating signals in response thereto and processor operatively associated with the sensors for receiving and manipulating the signals to produce a generalization indicative of normal and abnormal physiological condition of mammalian tissue. The processor is characterized to include a neural network having a predetermined solution spaced memory, the solution space memory including regions indicative of two or more physiological conditions, wherein the generalization is characterized by the signals projected into the regions.

U.S. Pat. No. 5,412,665 to Gruodis et al. issued on May 2, 1995 with the title "Parallel operation linear feedback shift register", and is incorporated herein by reference. U.S. Pat. No. 5,412,665 describes a parallel operation linear-feedback shift-register (LFSR) that generates random test patterns or creates a signature that represents the response of a device under test at ultra high speed using low speed components and/or a slow rate clock. The apparatus is comprised of: a register connected to an external clock, and a plurality of combinatorial logic networks sequentially connected, the last of which drives the register which in turn feeds back into the first of the combinatorial logic networks. Each of the combinatorial networks provides a pseudo-random pattern, outputted in parallel, thereby creating a high speed data flow. By providing additional data inputs to the combinatorial networks, the pseudo-random patterns become the signature of the input data.

U.S. Pat. No. 5,733,721 to Hemstreet III et al. issued on Mar. 31, 1998 with the title "Cell analysis method using quantitative fluorescence image analysis", and is incorporated herein by reference. U.S. Pat. No. 5,733,721 describes a system for evaluating one or more biochemical markers for evaluating individual cancer risk, cancer diagnosis and for monitoring therapeutic effectiveness and cancer recurrence, particularly of bladder cancer. The system uses automated quantitative fluorescence image analysis of a cell sample collected from a body organ. Cells are treated with a fixative solution which inhibits crystal formation. Cell images are selected and stored as grey level images for further analysis. Cell images may be corrected for autofluorescence using a novel autofluorescence correction method. A neural net computer may be used to distinguish true-positive images from false-positive images to improve accuracy of cancer risk assessment. Cells having images positive for a marker may be compared to threshold quantities related to predetermined cancer risk.

U.S. Pat. No. 5,983,211 to Heseltine et al. issued on Nov. 9, 1999 with the title "Method and apparatus for the diagnosis of colorectal cancer", and is incorporated herein by reference. U.S. Pat. No. 5,983,211 describes a process in which cancer of the colon is assessed in a patient. The probabilities of developing cancer involves the initial step of extracting a set of sample body fluids from the patient. Fluids can be evaluated to determine certain marker constituents in the body fluids. Fluids which are extracted have some relationship to me development of cancer, precancer or tendency toward cancerous conditions. The body fluid markers are measured and other quantified. The marker data then is evaluated using a nonlinear technique exemplified through the use of a multiple input and multiple output neural network having a variable learning rate and training rate. The neural network is provided with data from other patients for the same or similar markers. Data from other patients who did and did not have cancer is used in the learning of the neural network which thereby processes the data and provides a determination that the patient has a cancerous condition, precancer cells or a tendency towards cancer.

U.S. Pat. No. 6,125,194 to Yeh et al. issued on Sep. 26, 2000 with the title "Method and system for re-screening nodules in radiological images using multi-resolution", and is incorporated herein by reference. U.S. Pat. No. 6,125,194 describes an automated detection method and system to improve the diagnostic procedures of radiological images containing abnormalities, such as lung cancer nodules. The detection method and system use a multi-resolution approach to enable the efficient detection of nodules of different sizes, and to further enable the use of a single nodule phantom for correlation and matching in order to detect all or most nodule sizes. The detection method and system use spherical parameters to characterize the nodules, thus enabling a more accurate detection of non-conspicuous nodules. A robust pixel threshold generation technique is applied in order to increase the sensitivity of the system. In addition, the detection method and system increase the sensitivity of true nodule detection by analyzing only the negative cases, and by recommending further re-assessment only of cases determined by the detection method and system to be positive. The detection method and system use multiple classifiers including back propagation neural network, data fusion, decision based pruned neural network, and convolution neural network architecture to generate the classification score for the classification of lung nodules. Such multiple neural network architectures enable the learning of subtle characteristics of nodules to differentiate the nodules from the corresponding anatomic background. A final decision making then selects a portion of films with highly suspicious nodules for further reviewing.

U.S. Pat. No. 6,284,482 to Eisen et al. issued on Sep. 4, 2001 with the title "Method for detection of abnormal keratinization in epithelial tissue", and is incorporated herein by reference. U.S. Pat. No. 6,284,482 describes an analytical system, including an imaging system, to detect precancerous and cancerous cells. A transepithelial non-lacerational brush produces sufficient cells from all three layers of the epithelium so that an analytical system comprising a programmed computer can detect which cells exhibit abnormal keratinization and require further examination because of a likely suspicion of said pre-cancerous and cancerous conditions. The method and system can apply to the diagnosis non-cancerous conditions as well.

U.S. Pat. No. 6,463,438 to Veltri et al. issued on Oct. 8, 2002 with the title "Neural network for cell image analysis for identification of abnormal cells", and is incorporated herein by reference. U.S. Pat. No. 6,463,438 describes a neural network is used in a system to detect abnormalities in cells, including cancer in bladder tissue cells. The system has an image analysis system for generating data representative of imaging variables from an image of stained cells. The set of data is provided to a neural network which has been trained to detect abnormalities from known tissue cells with respect to the data from the same set of imaging variables. A conventional sigmoid-activated neural network, or alternatively, a hybrid neural network having a combination of sigmoid, Gaussian and sinusoidal activation functions may be utilized. The trained neural network applies a set of weight factors obtained during training to the data to classify the unknown tissue cell as normal or abnormal.

U.S. Pat. No. 6,553,356 to Good et al. issued on Apr. 22, 2003 with the title "Multi-view computer-assisted diagnosis", and is incorporated herein by reference. U.S. Pat. No. 6,553,356 describes abnormal regions in living tissue are detected by obtaining images from different views of the living tissue; performing single-image CAD of each image to determine suspected abnormal regions depicted in the image; and combining measurements of the suspected abnormal regions in each image to determine whether a suspected abnormal region is an abnormal region. The living tissue may be a human breast and the abnormal region may be a mass in the breast. Ipsilateral mammographic views of the breast, a craniocaudal view, and a mediolateral oblique view may be used. Features which are relatively invariant or behave predictably with respect to breast compression are extracted using the single-image CAD and then combined.

U.S. Pat. No. 6,962,789 to Bacus issued on Nov. 8, 2005 with the title "Method for quantitating a protein by image analysis", and is incorporated herein by reference. U.S. Pat.

No. 6,962,789 describes a method for determining expression levels of one or a multiplicity of target proteins in a tissue or cell sample.

U.S. Pat. No. 6,996,549 to Zhang et al. issued on Feb. 7, 2006 with the title "Computer-aided image analysis", and is incorporated herein by reference. U.S. Pat. No. 6,996,549 describes digitized image data that are input into a processor where a detection component identifies the areas (objects) of particular interest in the image and, by segmentation, separates those objects from the background. A feature extraction component formulates numerical values relevant to the classification task from the segmented objects. Results of the preceding analysis steps are input into a trained learning machine classifier which produces an output which may consist of an index discriminating between two possible diagnoses, or some other output in the desired output format. In one embodiment, digitized image data are input into a plurality of subsystems, each subsystem having one or more support vector machines. Pre-processing may include the use of known transformations which facilitate extraction of the useful data. Each subsystem analyzes the data relevant to a different feature or characteristic found within the image. Once each subsystem completes its analysis and classification, the output for all subsystems is input into an overall support vector machine analyzer which combines the data to make a diagnosis, decision or other action which utilizes the knowledge obtained from the image.

U.S. Pat. No. 7,155,050 to Sloge et al. issued on Dec. 26, 2006 with the title "Method of analyzing cell samples, by creating and analyzing a resultant image", and is incorporated herein by reference. U.S. Pat. No. 7,155,050 describes comparing multiple samples of cell extract containing a plurality of components. The method includes the steps of preparing at least two samples of cell extract from at least two groups of cells and of exposing each of said sample of said cell extract to a different one of a set of matched markers, e.g., luminescent markers, to bind the marker to the cell extract to label the cell extract, each marker within said set of markers being capable of binding to the cell extract and can be individually detected from all other markers within said set. The samples are then mixed to form a mixture and said mixture is electrophoresed to separate the components within the cell extract. At least two electronic images of the electrophoresed mixture are obtained (I) by detection of the individual markers, each image being represented by detection of a marker different from the others. One resultant electronic image ($I_{res}$) of the obtained at least two electronic images is created (II) and analyzed in order to identify spot analysis areas (III). The identified spot analysis areas are applied on the respective at least two electronic images for evaluating said areas in order to detect spots representing components of said cell extracts (IV).

U.S. Pat. No. 7,760,927 to Gholap et al. issued on Jul. 20, 2010 with the title "Method and system for digital image based tissue independent simultaneous nucleus cytoplasm and membrane quantitation", and is incorporated herein by reference. U.S. Pat. No. 7,760,927 describes a method and system for automatic digital image based tissue independent simultaneous nucleus, cytoplasm and membrane quantitation. Plural types of pixels including cell components including at least cell cytoplasm and cell membranes from a biological tissue sample to which a chemical compound has been applied and has been processed to remove background pixels and pixels including counterstained components are simultaneously identified. The identified cell components pixels are automatically classified to determine a medical conclusion such as a human breast cancer, a human prostate cancer or an animal cancer.

U.S. Pat. No. 7,979,212 to Gholap et al. issued on Jul. 12, 2011 with the title "Method and system for morphology based mitosis identification and classification of digital images", and is incorporated herein by reference. U.S. Pat. No. 7,979,212 describes a method and system for morphology-based mitosis identification and classification of digital images. Luminance parameters such as intensity, etc. from a digital image of a biological sample (e.g., tissue cells) to which a chemical compound (e.g., a marker dye) has been applied are analyzed and corrected if necessary. Morphological parameters (e.g., size, elongation ratio, parallelism, boundary roughness, convex hull shape, etc.) from individual components within the biological sample are analyzed. A medical conclusion (e.g., type and count of mitotic cells) or a life science and biotechnology experiment conclusion is determined from the analyzed luminance and morphological parameters. The method and system may be used to develop applications for automatically obtaining a medical diagnosis (e.g., a carcinoma diagnosis).

U.S. Pat. No. 8,064,679 to Griffin issued on Nov. 22, 2011 with the title "Targeted edge detection method and apparatus for cytological image processing applications", and is incorporated herein by reference. This U.S. Pat. No. 8,064,679 describes that edges in cytological image data are identified by obtaining a digital image of a specimen and computing a gradient image from the obtained digital image. A scaling function is applied to the grayscale image to identify regions of interest (e.g., edges of cell nuclei) in the digital image. Edges of the regions of interest are then identified based on the product of the computed gradient image and the scaling image. The scaling function may be applied to each image frame and one or more scaling thresholds are established for each frame to selectively pass, suppress, or scale pixels based on their measured intensity values. The scaled image resulting from application of the scaling function is multiplied with the gradient image to produce a targeted gradient image that identifies the edges of the region of interest. The targeted gradient image isolates edges corresponding to particular cellular structures, while rejecting other edges within the image.

U.S. Pat. No. 8,642,349 to Yeatman et al. issued on Feb. 4, 2014 with the title "Artificial neural network proteomic tumor classification", and is incorporated herein by reference. U.S. Pat. No. 8,642,349 describes a tumor classifier based on protein expression. Also disclosed is the use of proteomics to construct a highly accurate artificial neural network (ANN)-based classifier for the detection of an individual tumor type, as well as distinguishing between six common tumor types in an unknown primary diagnosis setting. Discriminating sets of proteins are also identified and are used as biomarkers for six carcinomas. A leave-one-out cross validation (LOOCV) method was used to test the ability of the constructed network to predict the single held out sample from each iteration with a maximum predictive accuracy of 87% and an average predictive accuracy of 82% over the range of proteins chosen for its construction.

U.S. Pat. No. 8,644,582 to Yoshihara et al. issued on Feb. 4, 2014 with the title "Support system for histopathological diagnosis, support program for histopathological diagnosis", and is incorporated herein by reference. U.S. Pat. No. 8,644,582 describes a support system for histopathological diagnosis includes a cell nucleus uniformity evaluation unit evaluating a uniformity of a plurality of cell nuclei included in a ductal region in an image. With this configuration, there is provided a support system, a support method and a support program for histopathological diagnosis, which enables realization of highly accurate cancer differentiation in a pathological diagnosis.

United States Patent publication US2011/0081087 by Moore published on Apr. 7, 2011 with the title "Fast Hysteresis Thresholding in Canny Edge Detection", and is incorporated herein by reference. Patent publication US2011/0081087 describes a method of image processing that includes non-recursive hysteresis thresholding in Canny edge detection. The non-recursive hysteresis thresholding reduces computational complexity and eliminates the potential for call stack overflow. More specifically, hysteresis thresholding is performed in a raster-scan order pass over the image data to connect edge segments to form continuous edges.

This in addition, the following U.S. patent publications discuss aspects and methods that can be used in some embodiments of the invention: US2002/0001586, US2004/0043436, US2006/0036372, US2006/0084125, US2007/0099207, US2009/0252728, US2009/0317836, US2009/0326359, US2010/0086932, US2010/0111396, US2010/0119128, US2010/0128950, US2010/0172568, US2010/0323903, US2011/0282819, US2012/0052063, US2012/0082362, US2012/0177280, US2013/0071876, US2014/0080731, and US2014/0139625, each of which is hereby incorporated herein by reference in its entirety for all purposes.

What is needed is an improved method for automatically detecting abnormal cells and for automatically distinguishing normal cells from cancerous cells and diagnosing and treating cancers.

SUMMARY OF THE INVENTION

In some embodiments, the present invention provides a non-transitory computer-readable medium having instructions stored thereon for causing a suitably programmed information processor to execute a method that includes: eliciting and receiving a digital photomicrograph image of cells; determining a boundary of a cell in the image; identifying a plurality of characteristics of the cell from image-pixel data from within the identified boundary of the cell; reading a plurality of cell characteristics of a plurality of types of cells from a database; comparing the identified characteristics of the cells in the image to the plurality of cell characteristics read from the database; and determining a pathology based on the comparing.

One or more well-known biopsy techniques are used to obtain a tissue sample from a patient. Optionally, one or more well-known staining techniques are applied to the tissue sample to obtain a stained tissue sample. One or more optical and/or confocal and/or other types of microscopy techniques are used to capture a photomicrograph image of the tissue sample and/or the stained tissue sample. In some embodiments, white-light illumination (for example, from an incandescent lamp or "white" LED (one having a blue peak at 455 nm and emissions at green and red from fluorescent materials in the LED)) is used to illuminate the sample and a digital red-green-blue (RGB) camera is used to capture an image. In some embodiments, a plurality of individually activated light sources (for example LEDs (e.g., semiconductor light sources having full-width half-maximum (FWHM) bandwidths of 10 nm to 50 nm, each emitting a different spectrum of wavelengths), are activated successively to capture images of the sample Some embodiments further include instructions to cause the method to further include: calculating red-green-blue (RGB) and/or ultraviolet, fluorescent and infrared (collectively RGBUFI) values for a plurality of pixels within the determined boundary of the cell; and determining a first number value for how many of the plurality of pixels within the determined boundary of the cell have a red value greater than a red-threshold value for indication of red blood cells (RBCs) in the image and a green value no more than a green-threshold value for RBCs and a blue value no more than a blue-threshold value for RBCs; and based on the first number value, determining whether to flag the image as possibly indicating hematuria. In some such embodiments, the green-threshold value for RBCs is zero and the blue-threshold value for RBCs is zero.

Some embodiments further include a first matrix containing a plurality of arrays of stored values of a plurality of morphometric characteristics of images of a cell-image database; and further instructions to cause the method to further include: applying one or more feature-detection algorithms to the digital photomicrograph image and storing results thereof into an array of feature-detection results; calculating a distance between the array of feature-detection results and each of the plurality of arrays of stored values in the first matrix; determining which of the calculated distances is shortest in order to obtain which one of the plurality of arrays of stored values has a highest correlation to the digital photomicrograph image.

In some embodiments, the results from the method are used to provide a diagnosis of a condition of a human patient, and to provide a recommended treatment, which recommended treatment is then given to the patient by a medical practitioner or by the patient herself or himself.

There are multiple embodiments described herein, each of which can be combined with one or more other embodiments described herein and/or in patents and patent-application publications that are set forth and incorporated herein by reference. For each embodiment described as having a plurality of parts or features, other embodiments of the present invention implement subsets of the described embodiment that omit one or more elements. Some such subset embodiments then add one or more elements, features or parts, as described in other exemplary embodiments, to form combination embodiments of the present invention.

BRIEF DESCRIPTION OF THE DRAWINGS

FIG. 5 is a flowchart of a method 500 that includes features that are used along with at least parts of the method 101 of FIG. 1A, method 201 of FIG. 2A, and/or apparatus 202 of FIG. 2B used in some embodiments of the present invention.

FIG. 6 is a representation of graph 600 of a histogram of pixel brightnesses that is used in some embodiments of the present invention.

FIG. 7 is a representation of formula 700 for nucleus-to-cytoplasm ratio that is used in some embodiments of the present invention.

FIG. 8 is a flowchart of a method 800 that includes features that are used along with at least parts of the method 101 of FIG. 1A, method 201 of FIG. 2A, and/or apparatus 202 of FIG. 2B used in some embodiments of the present invention.

FIG. 9 includes a starting photomicrograph 901 and a processed image 909 wherein some pixels meeting a first criterion are converted to "white" and other pixels meeting other criteria are converted to "black" according to some embodiments of the present invention.

FIG. 10 is a flowchart of a hematuria-detection method 1000 used in some embodiments of the present invention.

FIG. 11 is a flowchart of an enhanced curvature-detection method 1100 used in some embodiments of the present invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention provides materials, structures, and methods for automated cell analysis, particularly to distinguish normal cells from various types of cancerous cells and other abnormal cells.

Figure 1A:
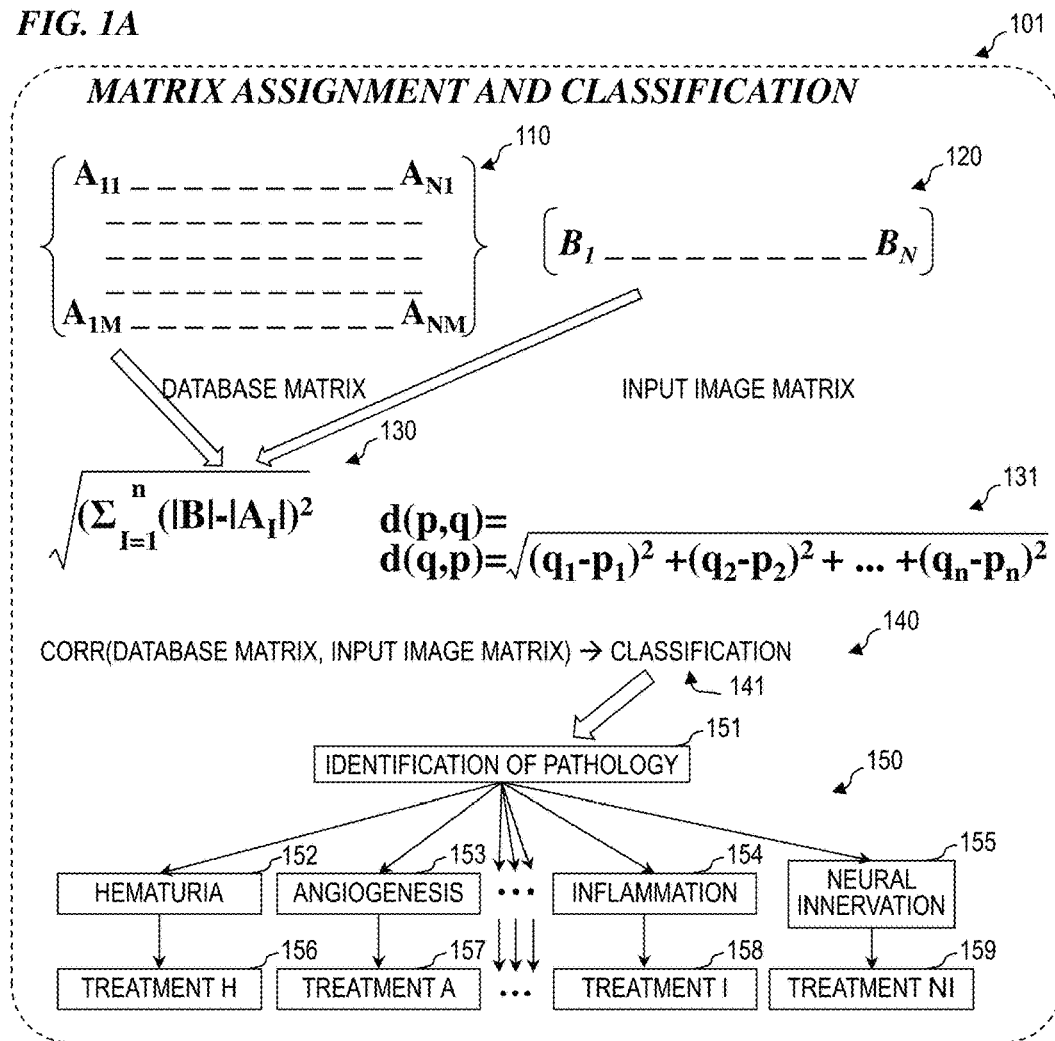
FIG. 1A is a schematic representation of a method 101 according to one embodiment of the present invention that correlates a matrix B 120 of characteristics determined from a photomicrograph image to a matrix A 110 of characteristics of known normal cells and known cells of previously determined pathologies in order to identify one (or more) of a plurality of possible conditions, which can then be used to determine an appropriate treatment regimen.

FIG. 1A is a schematic representation of a method 101 according to one embodiment of the present invention that correlates a matrix B 120 of characteristics determined from a photomicrograph image to a database matrix A 110 of characteristics of known normal cells and known cells of previously determined pathologies in order to identify one (or more) of a plurality of possible conditions, which can then be used to determine an appropriate treatment regimen. Database matrix A 110 represents a database of characteristics of images that have been previously analyzed and classified, input image matrix B 120 represents an array or vector of characteristics that have been derived from an unclassified new image of cells that are to be analyzed, and formula 130 and/or formula 131 are used to determine the correlations 140 between the each one of the rows of database matrix A 110 and the data of input image matrix B 120. These correlations 140 are used to determine a classification 141, which indicates either that the cells appear normal or goes to process 150 that provides an identification 151 of a pathology (e.g., as one of a plurality of possible pathologies 152-155, which in turn each indicate one or more treatments 156-159). In some embodiments, the result of the method 101 is the delivery to the patient of an appropriate treatment 156-159 determined by the present invention that represents the best or most effective treatment for the identified pathology. In some embodiments, each treatment selection is double checked by a trained medical professional, such as a medical doctor, and/or administered by that trained medical professional. In some embodiments, additional tissue samples are later acquired (e.g., by biopsy, blood or urine samples or the like) and photomicrographs of those samples are analyzed by the system and method of the present invention to determine whether the treatment is resulting in an expected change in the tissue, and if not, a different, additional, or adjusted treatment is recommended by the present invention and delivered to the patient to attempt to better treat the condition.

Figure 1B:
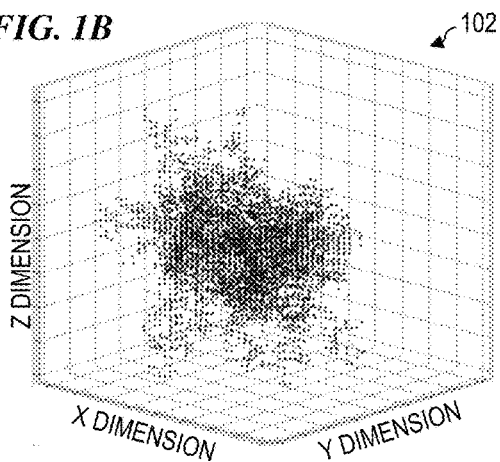
FIG. 1B is a representation of graph 102 of a matrix of characteristics for a plurality of images of different normal and abnormal cells (in this case, a 3D graph having three dimensions of identifiable characteristics).

FIG. 1B is a representation of graph 102 of a matrix of characteristics for a plurality of different normal and abnormal cells (in this case, a 3D graph having three dimensions of identifiable characteristics). In other embodiments, a larger or smaller number of characteristics are used. In some embodiments, different weights are applied to different ones of the characteristics for each of a plurality of rows of database matrix A 110 (see FIG. 1A) such that characteristics that are most important for each identification are weighted appropriately to ensure the best result. Each dot on this graph indicates a magnitude of a characteristic in the X-dimension, a magnitude of a characteristic in the Y-dimension, and a magnitude of a characteristic in the Z-dimension of the images that have been previously classified. This matrix as a whole may represent a universe of characteristics of a set of training or calibration images, wherein different subsets represent various different diagnoses (some of which are clearly indicative of normal cells or a particular pathology, and others of which indicate intermediate results that do not clearly indicate a particular diagnosis).

Figure 1C:
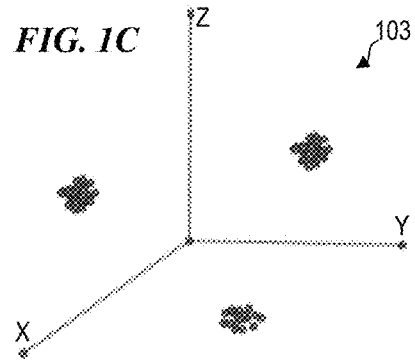
FIG. 1C is a representation of graph 103 of characteristics for each of a large plurality of different images of each of three types of normal and abnormal cells (in this case, a 3D graph having three dimensions of identifiable characteristics)

FIG. 1C is a representation of graph 103 of characteristics for each of a large plurality of different images of each of three types of normal and abnormal cells (in this case, a 3D graph having three dimensions of identifiable characteristics), wherein the group of images in the upper left have substantial and similar amounts of the X characteristic and the Z characteristic but little or no amount of the Y characteristic, the group of images in the upper right have substantial and similar amounts of the Y characteristic and the Z characteristic but little or no amount of the X characteristic, and the group of images in the lower middle have substantial and similar amounts of the X characteristic and the Y characteristic but little or no amount of the Z characteristic.

Figure 2A:
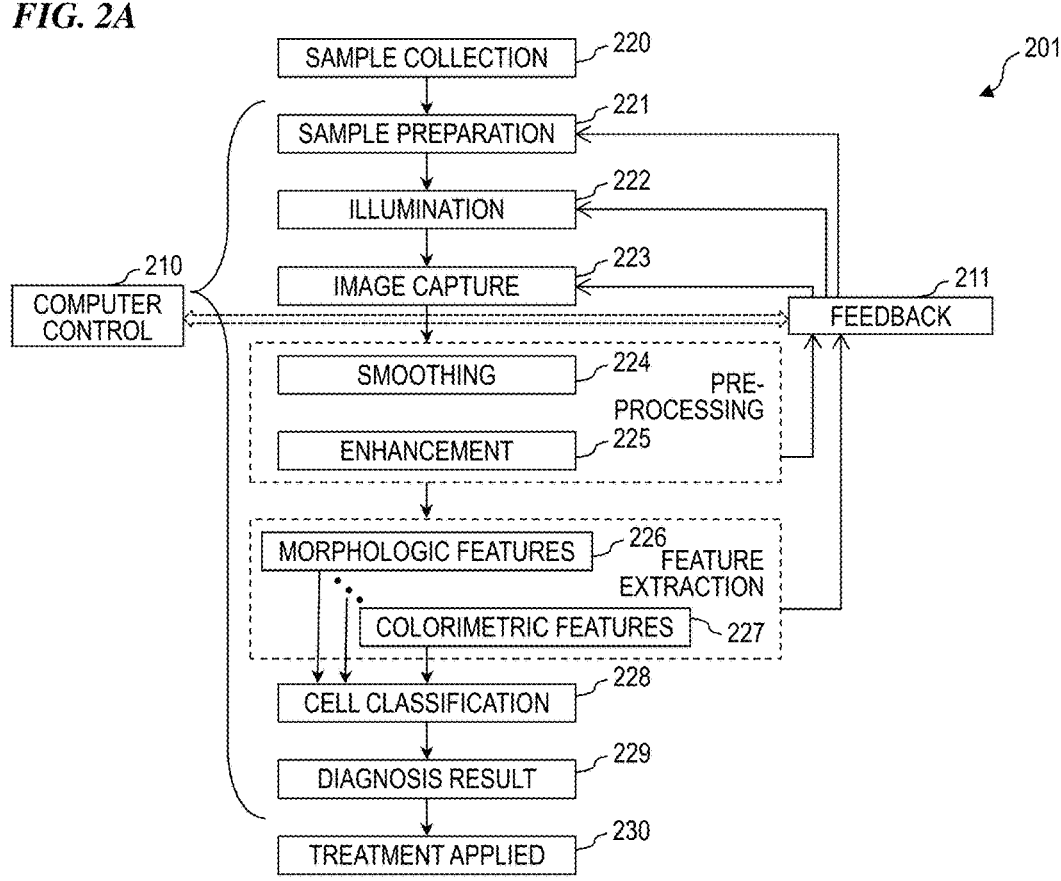
FIG. 2A is a flowchart of a method 201 that includes features that are used along with some embodiments of the method 101 of FIG. 1A.

FIG. 2A is a flowchart of a method 201 that includes features that are used along with some embodiments of the method 101 of FIG. 1A. In some embodiments, a computer control 210 controls the performance of the method, which in some embodiments, also includes a feedback process 211 that uses results of the pre-processing and/or feature extraction to adjust the conditions and process of image acquisition. In some embodiments, method 201 includes collecting 220 a sample of tissue from the patient (e.g., by biopsy or collection of urine, saliva, stool, blood and/or the like), preparing 221 the sample (e.g., by staining and/or other treatment, microtome slicing, positioning within the field-of-view of the microscope imager, and the like), illuminating 222 the sample (e.g., with adjustments, if needed, to the illumination's intensity, spectrum, direction and the like), and capturing 223 of a first image of the tissue sample. In some embodiments, additional images are later captured based on the automated analysis of the first image (and if needed based on analysis of the additional images). In some embodiments, each image is subjected to preprocessing, such as smoothing 224 of the image and enhancing 225 of the image, and feature extracting, such as extracting 226 morphologic features and/or determining 227 colorimetric features. In some embodiments, additional images are collected (e.g., in some embodiments, using different staining, positioning, illuminating; which in some embodiments, are adjusted using feedback 211, and/or in other embodiments, are adjusted based on predetermined parameters under computer control 210 without feedback 211), and the extracted features from one or more of the collected images are subjected to cell classifying 228 to obtain a diagnosis result 229, which is then, when appropriate, used as a basis for applying 230 a treatment to the patient to treat the detected pathology (if any). The preprocessing and feature extracting functions used in some embodiments of method 201 are further described below.

Figure 2B:
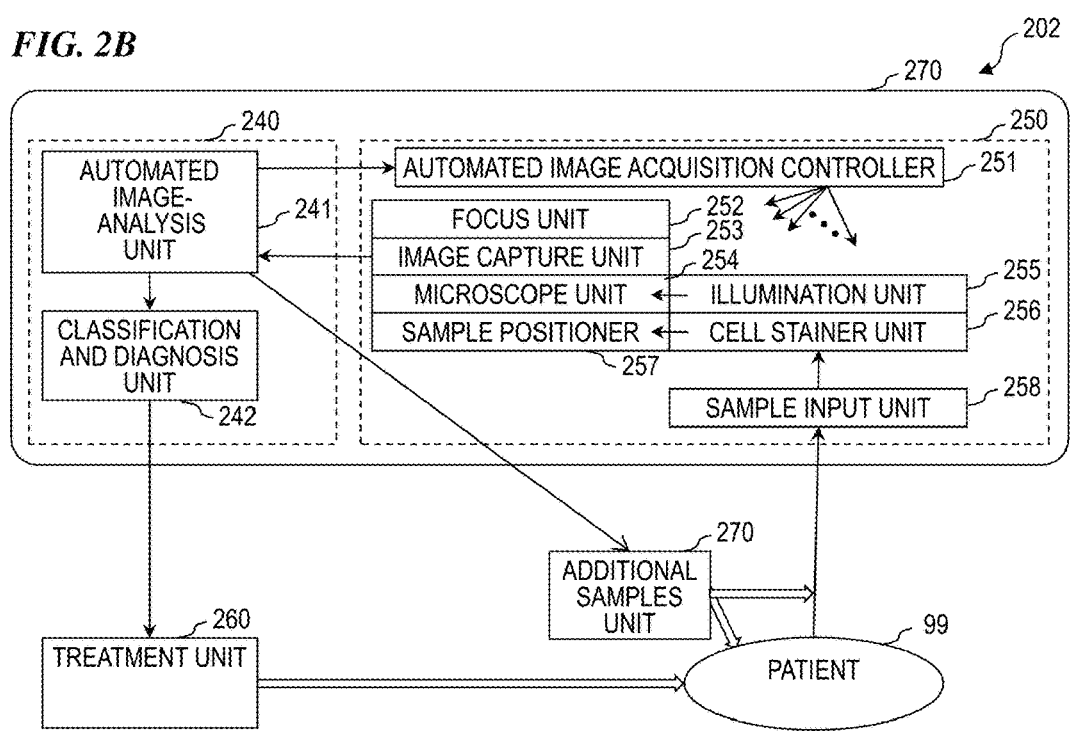
FIG. 2B is a block diagram of an apparatus 202 that implements features that are used along with at least parts of the method 101 of FIG. 1A and/or method 201 of FIG. 2A in some embodiments of the present invention.

FIG. 2B is a block diagram of an apparatus 202 that implements features that are used along with at least parts of the method 101 of FIG. 1A and/or method 201 of FIG. 2A in some embodiments of the present invention. In some embodiments, a computer 240 is used to implement the computer control function 210 of method 201 described above, and a controllable microscope imaging system 250 is used to implement the preparing 221, illuminating 222 and image capturing 223 of method 201. In some embodiments, imaging system 250 includes an automated image-acquisition controller 251 that controls the focus unit 252, the image-capture unit 253, the microscope optics units 254 (e.g., by selecting one of a plurality of optical objective lens systems), the illumination unit 255, the sample cell-stainer unit 256, the sample positioner 257 (e.g., an X-Y stage positioner, fluidic controls that push or pull cells into the field of view, or the like), and the sample input unit 258 (which receives the tissue sample or specimen and moves the sample through the various stations in microscope imaging system 250; in some embodiments, unit 258 includes a fluid-transport mechanism such as a fluidic pump). In some embodiments, computer 240 receives one or more images from image-capture unit 253 into automated image-analysis unit 241 (e.g., in some embodiments, implemented by a plurality of software functions or the like, which implement the preprocessing, such as smoothing 224 of the image and enhancing 225 of the image, and feature extracting, such as extracting 226 morphologic features and/or determining 227 colorimetric features). In some embodiments, automated image-analysis unit 241 provides real-time feedback to automated image-acquisition controller 251 to control acquisition of additional or different images of the same or different samples from the same patient, while in other embodiments, the image(s) are analyzed and no feedback or additional images are used. In some embodiments, computer 240 passes the extracted features obtained from the images to classification and diagnosis unit 242 that outputs the diagnosis parameters to treatment unit 260, which then provides a treatment to patient 99. In some embodiments, additional samples are obtained in real time by additional-sample unit 270 based on parameters (e.g., feedback information) from automated image-analysis unit 241. In some embodiments, additional-sample unit 270 administers an agent (such as a pharmaceutical, saline, or the like) to the patient to prepare for acquiring the additional sample that is delivered to sample-input unit 258. In some embodiments, a medical professional is used to enhance the functionality of apparatus 202 by participating in the acquisition of tissue samples (e.g., in some embodiments, additional-sample unit 270 provides instructions and/or a checklist for the medical professional to follow).

Figures 3, 4:
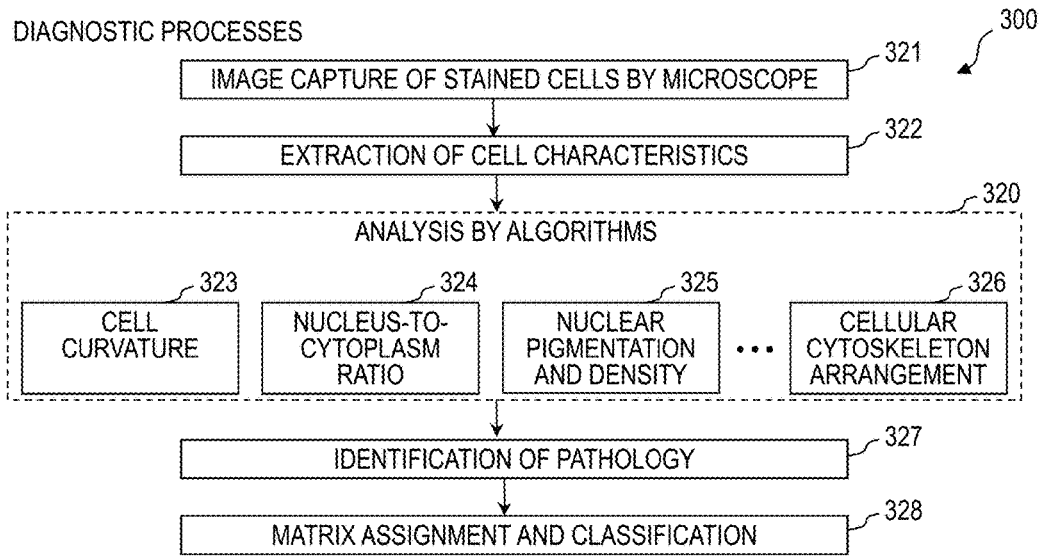
FIG. 3 is a flowchart of a method 300 that includes features that are used along with at least parts of method 101 of FIG. 1A, method 201 of FIG. 2A, and/or apparatus 202 of FIG. 2B in some embodiments of the present invention.
FIG. 4 is a set of equations 400, some or all of which are used in some embodiments of the present invention.

FIG. 3 is a flowchart of a method 300 that includes features that are used along with at least parts of method 101 of FIG. 1A, method 201 of FIG. 2A, and/or apparatus 202 of FIG. 2B in some embodiments of the present invention.

In some embodiments, method 300 includes a plurality of diagnostic processes that include image capturing 321 of images of stained cells under a microscope, extracting 322 of cell characteristics, analyzing 320 by algorithms (which, in some embodiments, include determining 323 cell curvature, calculating 324 of a nucleus-to-cytoplasm ratio, quantifying 325 nuclear pigmentation and density parameters, characterizing 326 cytoskeleton arrangement, and/or the like). In some embodiments, the results of the analysis processes 320 are transmitted to the processes of identifying 327 of the pathology and using 328 matrix assignment and classification algorithms to obtain an output diagnosis.

FIG. 4 is a set of "distance" equations 400, some or all of which are used in some embodiments of the present invention. In some embodiments, equations 130 and/or 131 of FIG. 1A are also used. Equation 410 determines a distance $d_1(A,B)$ between matrix A and matrix B by summing the absolute values of difference between all elements of A and all elements of B. Equation 420 determines a distance $d_2(A,B)$ between matrix A and matrix B by summing the squares of difference between all elements of A and all elements of B and then taking the square root of the result. Equation 430 determines a distance $d_\infty(A,B)$ between matrix A and matrix B by determining the maximums of absolute values of difference between all elements of A and all elements of B. Equation 440 determines a distance $d_m(A,B)$ between matrix A and matrix B using the formula set forth. As shown in FIG. 1A, Equation 130 determines a distance/correlation between a vector/array B representing characteristics derived from an image of cells of unknown pathology and each of a plurality of rows of a database matrix A of characteristics from prior images of known pathologies; and Equation 131 determines a distance/correlation between two vectors p and q by summing the squares of difference between all elements of p and the corresponding elements of q and then taking the square root of the result.

FIG. 5 is a flowchart of a method 500 that includes features that are used along with at least parts of the method 101 of FIG. 1A, method 201 of FIG. 2A, and/or apparatus 202 of FIG. 2B used in some embodiments of the present invention. In some embodiments, method 500 includes determining 521 a first set of features from an image and arranging a first-level ensemble of the first set of determined features and performing 522 (as a further part of the assembling) a first correlation measurement between the first-level ensemble and a database matrix of characteristics of various images of normal cells and of cancerous cells, and then examining 523 the result of the first correlation measurement and if clearly not cancerous cells (or if clearly normal cells), then branching to the normal-cell result block 525 and to the end 540, else (i.e., the examining indicates cancerous or non-normal cells) arranging a second-level ensemble of the first set of determined features (and/or including or substituting a second set of characteristics) and performing 532 (as a further part of the assembling) a second correlation measurement between the second-level ensemble and a database matrix of characteristics of various images of normal cells and of cancerous cells, and then examining 533 the result of the second correlation measurement and if clearly not cancerous cells (or if clearly normal cells), then branching to the normal-cell result block 535 and to the end 540; else branching to the not-normal cell or cancer cell result block 537 and to the end block 540.

FIG. 6 is a representation of a brightness-histogram graph 600 of pixel brightnesses that is used in some embodiments of the present invention. In some embodiments, this histogram graph 600 (or its numerical equivalents in table or other data representation form) of pixel brightnesses is used to establish a threshold between nucleus and cytoplasm portions of the image, and in some embodiments, also establish a hysteresis value, that are used to distinguish between nucleus and cytoplasm portions of each cell. In some other embodiments, a similar change-brightness-histogram graph, not shown (or its numerical equivalents in table or other data representation form), of the change in pixel brightness from one pixel to its neighboring pixels is used to establish a threshold between nucleus and cytoplasm portions of the image, and in some embodiments, also establish a hysteresis value, that are used, together or individually, to distinguish between nucleus and cytoplasm portions of each cell.

FIG. 7 is a representation of formula 700 for nucleus-to-cytoplasm ratio that is used in some embodiments of the present invention. In some embodiments, the threshold and/or hysteresis values from brightness-histogram graph 600, or from the similar change-brightness-histogram graph (or their numerical-data equivalents) are used to define which pixels are to be considered as nucleus pixels versus pixels to be considered as background pixels, and the sum or count of the two types of pixels thus distinguished are used in this formula to obtain a value of a nucleus-to-cytoplasm ratio. In some embodiments, this is one characteristic used in determining the correlation between the input (unclassified) image and preciously classified images.

FIG. 8 is a flowchart of a method 800 that includes features that are used along with at least parts of the method 101 of FIG. 1A, method 201 of FIG. 2A, and/or apparatus 202 of FIG. 2B used in some embodiments of the present invention. In some embodiments, method 800 includes obtaining 810 an image of one or more cells, and extracting 820 features of the image via analysis-by-algorithms. In some embodiments, the feature extraction 820 functions include calculating 821 a nucleus-to-cytoplasm ratio (see FIG. 7), determining 822 edges and curvature of the edges of cells, finding 823 a measurement of nuclear hyperchromasia, detecting 824 angiogenesis characteristics; ascertaining 825 signs of hematuria, discerning 826 signs of inflammation, characterizing 827 a cellular cytoskeleton arrangement and/or the like. In some embodiments, training images and images that have been examined by expert pathologists are analyzed by extracting 820 functions and the results are stored in a sample matrix 831 (also called a database matrix herein). This process is considered training or calibration of the system and method of the present invention. Then during normal operation, an image of unclassified cells is subjected to the analysis of block 820 and the results (characteristics of the image) are correlated to the sample matrix by correlating 832 the heretofore unclassified image results to the sample matrix 831 and the resulting correlation result 840 is indicative or whether the cells are benign/normal, or atypical (having some characteristics that are suspicious or possible signs of cancer), or cancerous (where the system indicates that cancer was detected).

As used herein, the verbs calculating, determining, finding, detecting, discerning, characterizing, relating, checking, applying, storing, obtaining, initiating, executing, programming, and other like terms represent software and/or hardware functions that yield a result, and all such terms may be implemented as described herein or by other equivalent or substitute functionality and are set forth in terminology (i.e., using different words for similar or identical functions) that allows clearer antecedent-basis discussion in individual paragraphs in this specification and its claims, while not necessarily restricting their meaning to be different or the same as other functionality described in other terms or similar terms in other paragraphs or claims.

FIG. 9 includes results of a method 900 using a starting photomicrograph 901 and the resulting processed image 909 wherein some pixels meeting a first criterion are converted to "white" and other pixels meeting other criteria are converted to "black" according to some embodiments of the present invention. In some embodiments, the software (and/or hardware) of the present invention uses Java®-implemented algorithms to identify morphometric characteristics of shape, color, and curvature attributes of bladder cells in images (which may be low-grade and high-grade images) from urine cytology tests. In some embodiments, the present invention uses existing edge-detection methods and modifications and new algorithms set forth herein to detect cell curvature. Also, in some embodiments, the software uses a method set forth below to identify red, green, blue color values and hue, saturation, and brightness values to find nucleus-to-cytoplasm ratios and nuclear hyperchromasia values. In the example here, red cell 920 is a skin or epithelial cell that will be "removed" from the image (e.g., in some embodiments, by whitening most or all of the pixels that have certain characteristics (for example, pixels with red components greater than some threshold value)) by the software of the present invention (which includes identifying and removing image portions representing extraneous cells and other image noise to leave only relevant cell information (e.g., bladder cells 910)).

FIG. 10 is a flowchart of a hematuria-detection method 1000 used in some embodiments of the present invention. In some embodiments, method 1000 includes obtaining 1010 an image of cells in urine; calculating 1020 the R.G.B. (red, green, and blue) values of each pixel in the cell image; recording 1030 the number of red pixels that contain non-zero r-values while b-value and g-value are both zero (or below some threshold values determined empirically or by histogram analysis as described for FIG. 6); and checking 1040 whether there are any (or a sufficient number of) red pixels to indicate possible hematuria detection because there may be red blood cells in the urine.

FIG. 11 is a flowchart of a nuclear hyperchromasia method 1100 used in some embodiments of the present invention. In some embodiments, method 1100 includes determining 1110 the lowest brightness value of all the pixels in the image, using the following pseudocode algorithm:

float[ ]*hsb*=color.*rgbtohsb*(*r,g,b*,null} and maxbrightness=math.max(maxbrightness,*hsb*[2]), where the result float[ ] hsb is the hue, saturation, and brightness of each pixel, and hsb[2] is the brightness of each pixel that is used. In some embodiments, this lowest brightness value is considered to be the nuclear hyperchromasia value.

Figure 12:
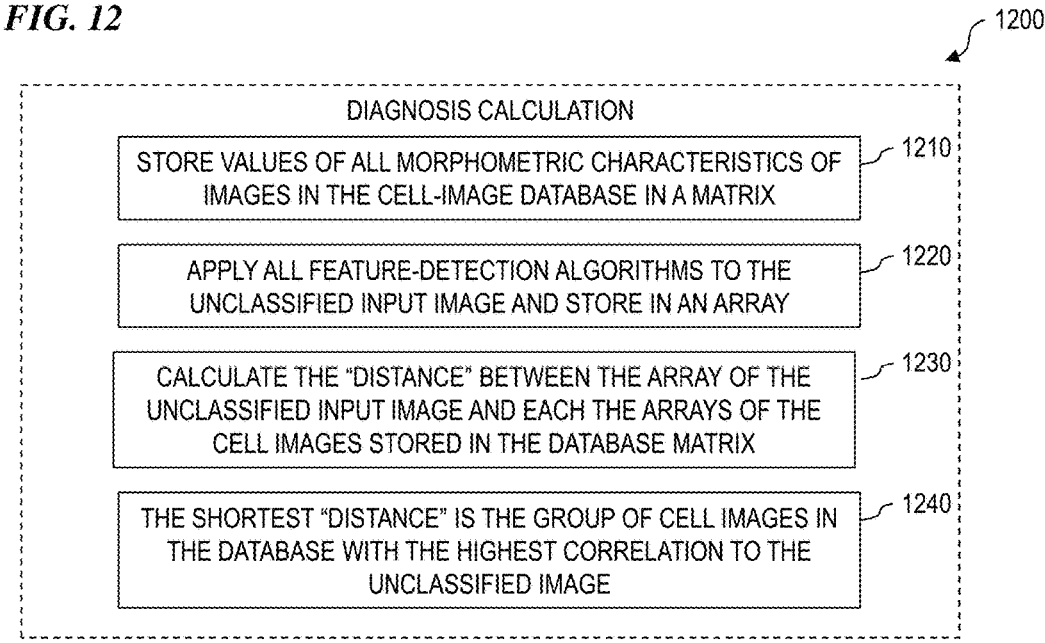
FIG. 12 is a flowchart of a diagnosis-calculation method 1200 used in some embodiments of the present invention.

FIG. 12 is a flowchart of a diagnosis-calculation method 1200 used in some embodiments of the present invention. In some embodiments, method 1200 includes storing 1210 values of all morphometric characteristics of images in the cell-image database in a matrix; applying 1220 all feature-detection algorithms to the unclassified input image and storing in an array; calculating 1230 the "distance" between the array of the unclassified input image and each the arrays of the cell images stored in the database matrix; and determining 1240 the shortest "distance," which is the group of one or more cell images in the database with the highest correlation(s) to the unclassified image. In other embodiments, edge-detection is performed using methods described in US patent publication US2011/0081087 by Moore published on Apr. 7, 2011 with the title "Fast Hysteresis Thresholding in Canny Edge Detection", which is incorporated herein by reference.

Figure 13:
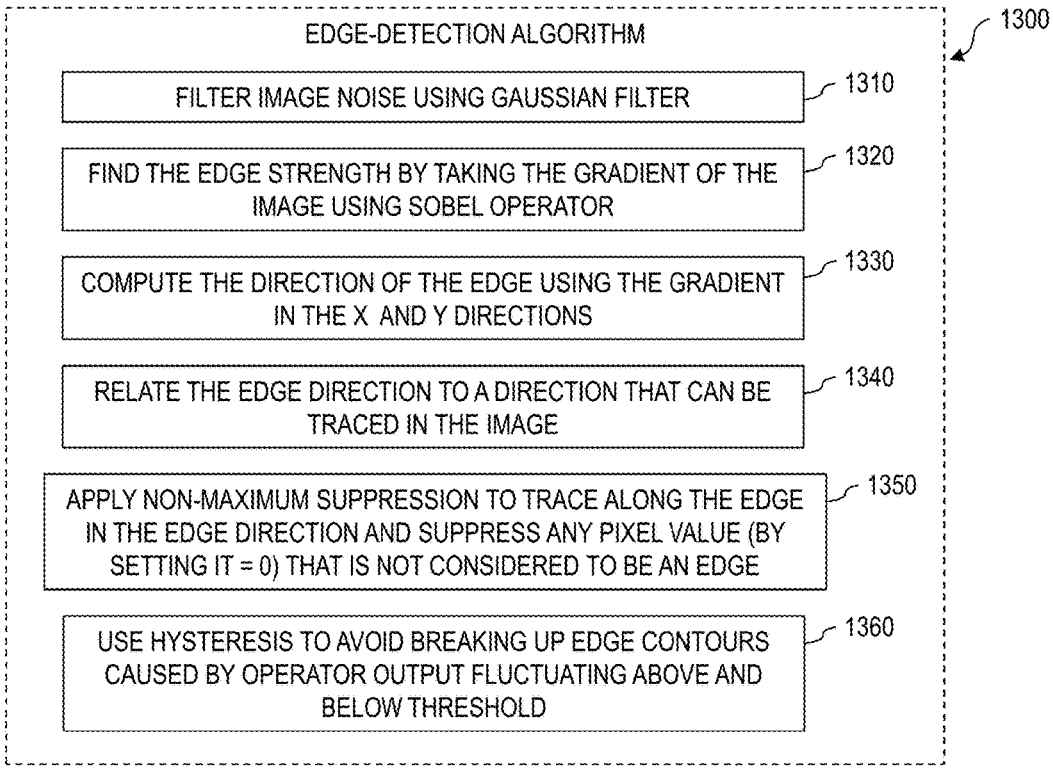
FIG. 13 is a flowchart of an edge-detection method 1300 used in some embodiments of the present invention.
Figure 19:
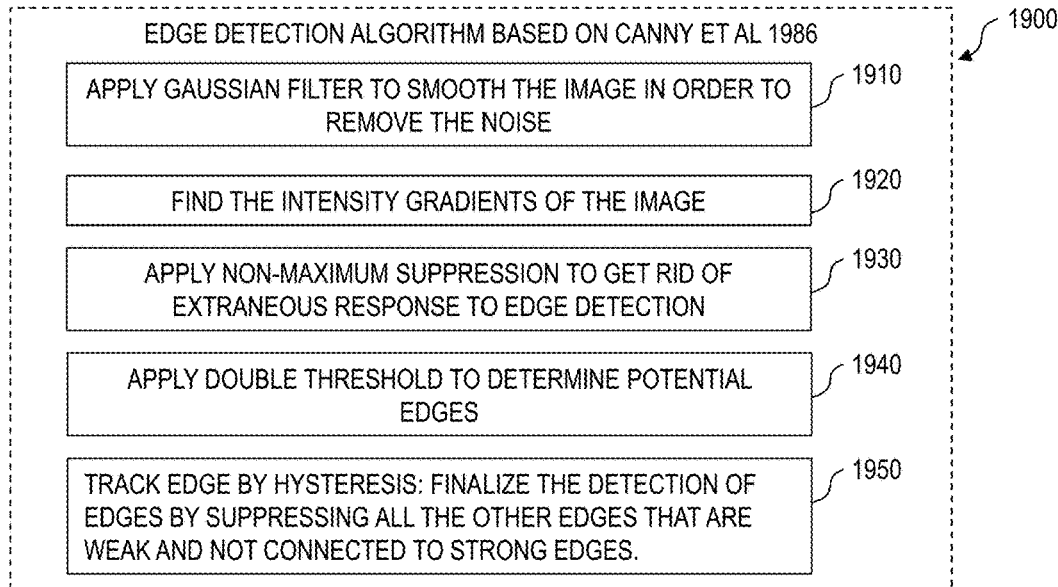
FIG. 19 is a flowchart of an edge-detection method 1900 used in some embodiments of the present invention.

FIG. 13 is a flowchart of an edge-detection method 1300 used in some embodiments of the present invention. In some embodiments, method 1300 includes filtering 1310 image noise using Gaussian filter; finding 1320 the edge strength by taking the gradient of the image using Sobel-Feldman operator (e.g., such as described in Danielsson, P. E., Seger, O., "Generalized and Separable Sobel Operators" in "Machine vision for three-dimensional scenes", Herbert Freeman (ed.), Academic Press (1990); Sobel, I. and Feldman, G., "A 3×3 Isotropic Gradient Operator for Image Processing", presented at the Stanford Artificial Intelligence Project (SAIL) in 1968; and in the Irwin Sobel paper 'History and Definition of the so-called "Sobel Operator", more appropriately named the Sobel-Feldman Operator' at www.researchgate.net/publication/239398674_An_ Isotropic_3_3_Image_Gradient_Operator, each of which is incorporated herein by reference); computing 1330 the direction of the edge using the gradient in the x and y directions; relating 1340 the edge direction to a direction that can be traced in the image; applying 1350 non-maximum suppression to trace along the edge in the edge direction and suppress any pixel value (e.g., by setting the pixel value to zero or some other readily identifiable or distinguishing value or color) that is not considered to be an edge; and using 1360 hysteresis to avoid breaking up edge contours caused by operator output fluctuating above and below threshold. FIG. 19 below sets forth another edge-detection method 1900 used in some embodiments. In some embodiments, the function of block 1320 is implemented using the edge-detection method described in the paper: Kanopoulos, Nick, Nagesh Vasanthavada, and Robert L. Baker, "Design of an image edge detection filter using the Sobel operator." Solid-State Circuits, IEEE Journal of 23.2 (1988): 358-367, which is incorporated herein by reference.

Figure 14:
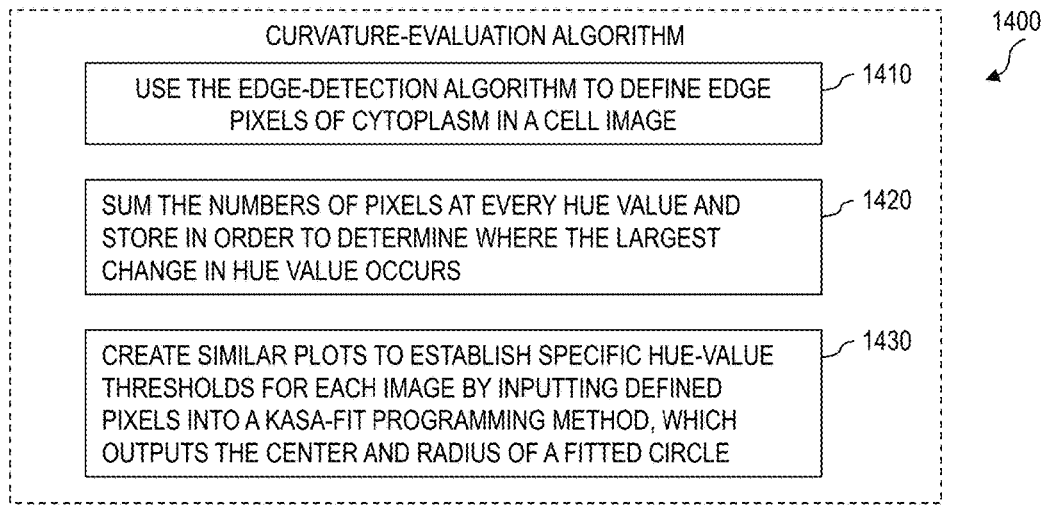
FIG. 14 is a flowchart of a curvature-detection method 1400 used in some embodiments of the present invention.

FIG. 14 is a flowchart of a curvature-detection method 1400 used in some embodiments of the present invention. In some embodiments, method 1400 includes using 1410 the edge-detection algorithm (of FIG. 13) to define edge pixels of cytoplasm in a cell image; summing 1420 the numbers of pixels at every hue value and storing them (e.g., in a suitable data structure such as a table or histogram graph) in order to determine where the largest change in hue value occurs; and creating 1430 similar plots to establish specific hue-value thresholds for each image by inputting defined pixels into a Kasa-fit programming method (e.g., such as described in I. Kåsa, "A circle fitting procedure and its error analysis", IEEE Trans. Inst. Meas., 25:8-14, 1976, which is incorporated herein by reference), which outputs the center and radius of a fitted circle.

Figure 15:
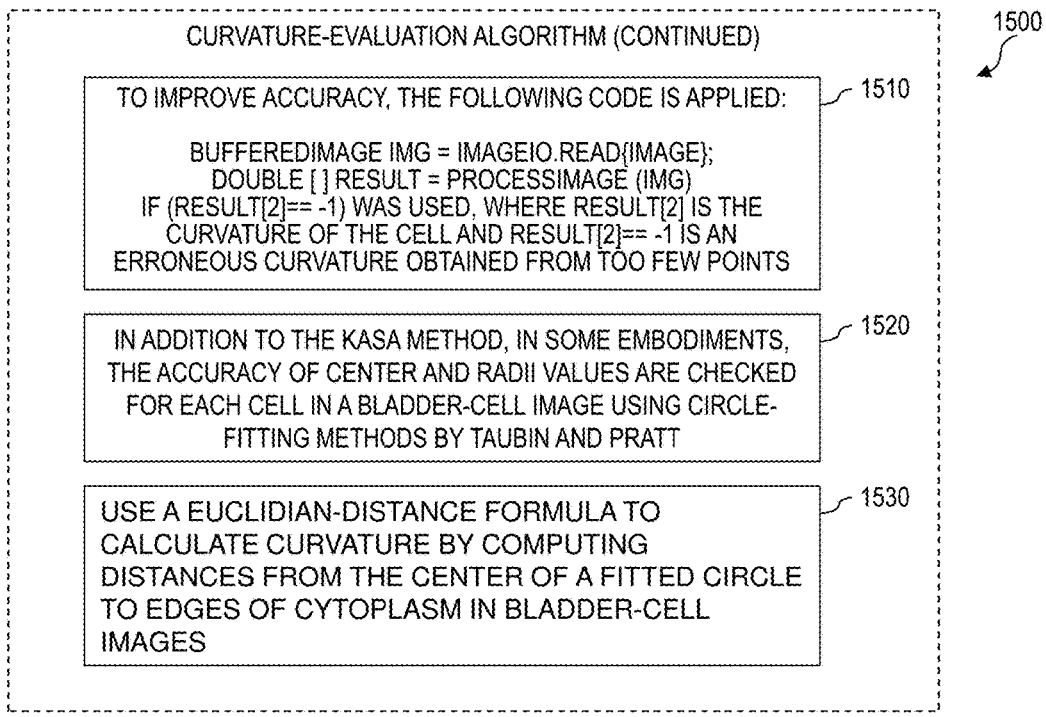
FIG. 15 is a flowchart of an enhanced curvature-detection method 1500 used in some embodiments of the present invention.

FIG. 15 is a flowchart of an enhanced curvature-detection method 1500 used in some embodiments of the present invention. In some embodiments, method 1500 includes applying 1510 (to improve accuracy), the following code:

bufferedimage*img*=image*io*.read{image};

double[ ]result=processimage(*img*)

if (result[2]==-1) is obtained, where result[2] is the curvature of the cell, result[2]==-1 indicates an erroneous curvature value obtained from too few points;

checking 1520 accuracy (in addition to the Kasa method, in some embodiments, the accuracy of center and radii values are checked for each cell in a bladder-cell image using circle-fitting methods by Taubin (e.g., G. Taubin in article "Estimation Of Planar Curves, Surfaces And Nonplanar Space Curves Defined By Implicit Equations, With Applications To Edge And Range Image Segmentation", IEEE Trans. PAMI, Vol. 13, pages 1115-1138, (1991)) and Pratt (e.g., V. Pratt. Direct least-squares fitting of algebraic surfaces. Computer Graphics, 21:145-152, 1987) each of which are incorporated herein by reference); and calculating 1530 curvature (in some embodiments, using a Euclidian-distance formula to calculate curvature by computing distances from the center of a fitted circle to edges of cytoplasm in bladder-cell images).

Figure 16:
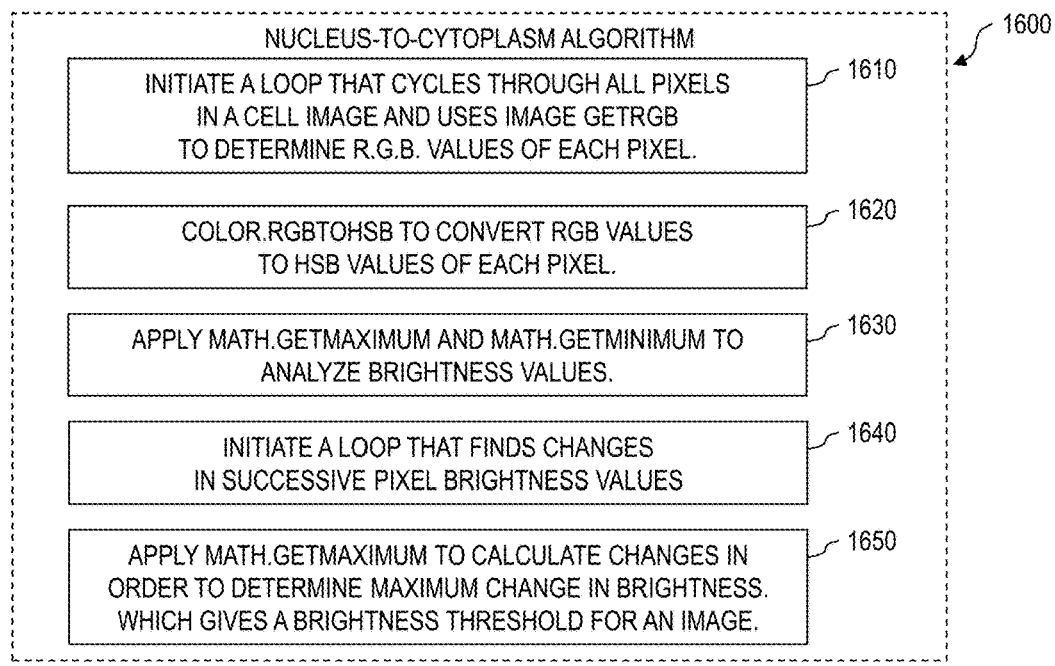
FIG. 16 is a flowchart of a nucleus-to-cytoplasm method 1600 used in some embodiments of the present invention.

FIG. 16 is a flowchart of a nucleus-to-cytoplasm method 1600 used in some embodiments of the present invention. In some embodiments, method 1600 includes initiating and executing 1610 a loop that cycles through all pixels in a cell image and uses image getrgb to determine R.G.B. values of each pixel; applying 1620 COLOR.RGBTOHSB to convert RGB values to HSB (hue-saturation-brightness) values of each pixel; applying 1630 MATH.GETMAXIMUM and MATH.GETMINIMUM to analyze brightness values, initiating and executing 1640 a loop that finds changes in successive pixel brightness values; and applying 1650 MATH.GETMAXIMUM to calculate changes in order to determine maximum change in brightness, which gives a brightness threshold for an image. In some embodiments, method 1600 is enhanced or continued by executing method 1700.

Figure 17:
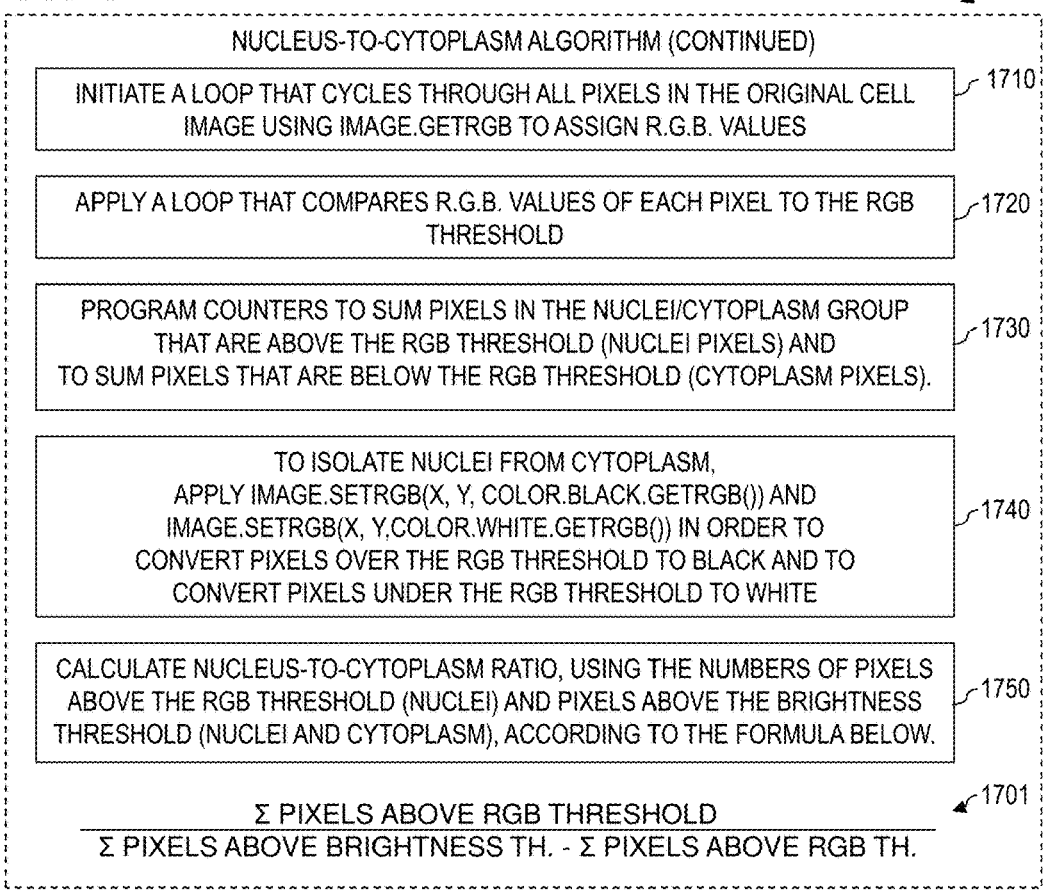
FIG. 17 is a flowchart of an enhanced nucleus-to-cytoplasm method 1700 used in some embodiments of the present invention.

FIG. 17 is a flowchart of an enhanced nucleus-to-cytoplasm method 1700 used in some embodiments of the present invention. In some embodiments, method 1700 includes executing method 1600; initiating and executing 1710 a loop that cycles through all pixels in the original cell image using image.getrgb to assign R.G.B. values; applying 1720 a loop that compares R.G.B. values of each pixel to the RGB threshold; programming 1730 counters to sum pixels in the nuclei/cytoplasm group that are above the RGB threshold (nuclei pixels) and to sum pixels that are below the RGB threshold (cytoplasm pixels); applying 1740 IMAGE.SETRGB(X, Y, COLOR.BLACK.GETRGB( )) and IMAGE.SETRGB(X, Y, COLOR.WHITE.GETRGB( )) in order to isolate nuclei from cytoplasm, for example by converting pixels over the RGB threshold to black and converting pixels under the RGB threshold to white; and calculating 1750 a nucleus-to-cytoplasm ratio, using the numbers of pixels above the RGB threshold (nuclei) and pixels above the brightness threshold (nuclei and cytoplasm), according to the formula below:

ΣPIXELS ABOVE *RGB* THRESHOLD/ΣPIXELS ABOVE BRIGHTNESS THRESHOLD– ΣPIXELS ABOVE *RGB* THRESHOLD.

Figure 18:
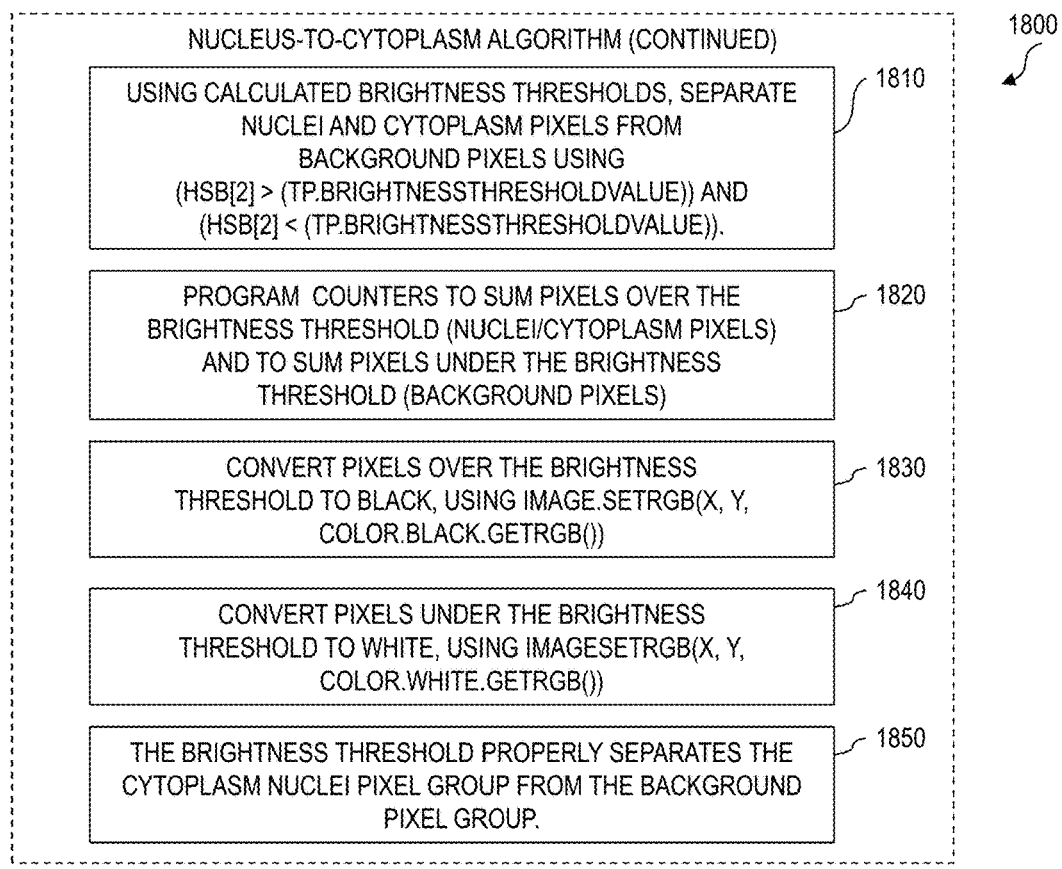
FIG. 18 is a flowchart of another enhanced nucleus-to-cytoplasm method 1800 used in some embodiments of the present invention.

FIG. 18 is a flowchart of a further enhanced nucleus-to-cytoplasm method 1800 used in some embodiments of the present invention. In some embodiments, method 1800 includes executing method 1600 and method 1700; separating 1810 (using the calculated brightness thresholds) nuclei and cytoplasm pixels from background pixels using (*HSB*[2]>(*TP*.BRIGHTNESSTHRESHOLDVALUE))
and (*HSB*[2]<(*TP*.BRIGHTNESSTHRESHOLD-VALUE));

programming 1820 counters to sum the number of pixels over the brightness threshold (to be considered as nuclei/cytoplasm pixels) and to sum the number of pixels under the brightness threshold (to be considered as background pixels); converting 1830 those pixels over the brightness threshold to black, using IMAGE.SETRGB(X, Y, COLOR.BLACK.GETRGB( )); converting 1840 those pixels under the brightness threshold to white, using IMAGESETRGB (X, Y, COLOR.WHITE.GETRGB( )); and determining the brightness threshold that properly separates the cytoplasm-and-nuclei pixel group from the background pixel group.

FIG. 19 is a flowchart of an edge-detection method 1900 used in some embodiments of the present invention, as an alternative or additional routine for method 1300 of FIG. 13 (i.e., in some embodiments, one, the other, or both methods 1300 and 1900 are applied to each generate data for a different set of one or more characteristics used by diagnosis method 1200). In some embodiments, method 1900 (based on Canny et al. 1988) includes applying 1910 a Gaussian filter to smooth the image in order to remove, or at least reduce, the "noise" from the image, finding 1920 the intensity gradients of the image, applying 1930 non-maximum suppression to eliminate extraneous response to edge detection, applying 1940 a double threshold to determine potential edges, and tracking 1950 the edge by hysteresis, and finalizing the detection of edges by suppressing all the other edges that are weak and not connected to strong edges. In some embodiments, the function of block 1910 is implemented using the method described in the paper: Deng, G., and L. W. Cahill, "An adaptive Gaussian filter for noise reduction and edge detection." Nuclear Science Symposium and Medical Imaging Conference, 1993. IEEE Conference Record. IEEE, 1993, which is incorporated herein by reference.

In contrast to the subject matter of U.S. Pat. Nos. 6,463,448 and 4,965,725, the software and/or hardware of the present invention do not form a classically defined "neural network" but rather computes correlation between cell images using formulas for distance between two matrices, in some embodiments, as set forth in one or more the equations in FIG. 4. For bladder-cancer-cell images, the matrix simplifies to a vector of size three (3) since three characteristics are examined: cell curvature (e.g., such as calculated in FIG. 14 and/or FIG. 15), cell hyperchromasia (e.g., such as calculated in FIG. 13) and cell nucleus-to-cytoplasm ratio (e.g., such as calculated in FIG. 16, FIG. 17 and/or FIG. 18). The size of the vector can be anywhere between one and n, where n is the integer number of characteristics.

In contrast to the subject matter of patent publication US2008/0166035, which outlines the biological basis for a cancer-detection software but lacks the computer software analysis, the software of some embodiments of the present invention is an automated, holistic software, which, in some embodiments, specifies several specific ways and combinations of ways to compute the comparative analysis of images.

The present invention differs from the inventor's "Breck Paper" (as set forth in Appendix 1) as follows. In the inventor's Breck paper, the original Canny edge detection method from 1986 was used. In the present invention, for some embodiments, the previous Canny method is modified to incorporate fast hysteresis-thresholding techniques described in patent publication US2011/0081087. Also, a completely new algorithm is used to detect red blood cells in urine samples, which is a specific application for bladder cancers and other cancers that can be diagnosed from urine samples. Additionally, the nucleus-to-cytoplasm ratio algorithm and the nuclear hyperchromasia algorithm are modified to more accurately detect the correct size of the nucleus and cytoplasm by bounding each cell area with pixel data output from the new edge-detection method of the present invention. Finally, the final diagnostic algorithm is altered to be smoother by saving all the database information as comma-separated values. Therefore, priming the software for identifying a new cancer would take up time correlated to the size of the cell-image database, and any patient scans after priming would be extremely time effective, lowering the processing time for a patient by a magnitude of about 100 ($10^2$). In three-dimensional (3D) space, plots of the database matrices can resemble the graph of FIG. 1B, where each axis represents a characteristic. Three characteristics are used for this illustrative sample plot: nucleus-to-cytoplasm ratio, nuclear hyperchromasia and cell curvature. Other cell-based diseases may have additional characteristics (and thus additional dimensions for the comparison of the unknown cell type in the image micrograph to the database of cell types), but three characteristic/dimensions are shown here to more easily visualize the invention.

In some embodiments, algorithms implemented in any suitable programming language (e.g., Java®, C++, and the like) provide the function of the pseudocode set forth in the following sections for software routines used in the present invention.

MainFile.java Pseudocode:
(In some alternative embodiments, Vesalius_SVM.m (one example of neural network software) is also used or is substituted for MainFile.java.)
  create four integer arrays, one for data storage, making calculations between the other 3 arrays and transferring information between, one for storing normal-type characteristics, one for storing suspicious-type characteristics, and one for storing abnormal-type characteristics;
  declare a filename, nwoutput.csv at a given path (e.g., "/Users/MyUsername/Documents/NWoutput.csv". The file nwoutput.csv is the output of DatabaseUpdate.csv. If the file exists there, parse the file using a CSV File Reader (see CSVFileReader.java);
  create an ArrayList of strings, storedValues;
  parse NWoutput.csv by putting the morphometric characteristics of normal, suspicious, and abnormal characteristics from a database of images into their associated arrays;
  create a BufferedImage by selecting an input image by its path. This will be the image that the software will compare to existing image data in the database;
  apply the ProcessImage function to extract the morphometric characteristics of the input image, and save these into an array;
  compare the array containing the morphometric characteristics of the input image to the each database array of the normal, suspicious, and abnormal using an dimensional Euclidian distance formula; and
  determine which value in the database array has the smallest Euclidian distance—this is the correct classification, and output this classification into the log. Also output any other algorithm outputs such as hematuria detection into the log at this time (see hematuria detection algorithm).

Vesalius_SVM.m
Support Vector Machines are supervised machine-learning models. In some embodiments, Support Vector Machines are used to classify urine cell images of potential bladder cancer patients as either normal or abnormal/suspicious.

First, the SVM classifier model is trained using training data that includes a set of urine-cell images. Using this model, new urine cell images are assigned either to the normal or abnormal/suspicious category.

The SVM model represents the features of the urine cell images as points in a high-dimensional space.

The SVM model then divides the two categories by constructing a hyperplane in this high dimensional space. The SVM model maximizes the width of the gap between training data samples and the hyperplane, so that the SVM model correctly classifies new urine cell images as either normal or abnormal/suspicious.

By maximizing the width of the gap between the training data samples and the constructed hyperplane, the generalization error is often minimal, i.e., the classification error on new urine cell images is made as small as possible.

In some embodiments, the following pseudocode is implemented in any suitable programming language (such as Java®) to implement portions of the functionality of the present invention:

DatabaseUpdate.java Pseudocode:
  use a java FileOutputStream to create a new csv file, NWoutput.csv. populate the first column in the CSV file with the names of images stored in a folder by parsing the folder using java's image, isDirectory, getName, and contains functions;
  create a string Dataset that will hold all morphometric characteristics of each cell in adjacent columns to the name of the image so that each row in the CSV file will contains the image name followed by its associated morphometric characteristics in separate columns;
  run the present invention's new ProcessImage method on input image to populate the string Dataset—The ProcessImage method runs the Nuclear-to-Cytoplasm Ratio, Nuclear Hyperchromasia, and Curvature algorithms on the input and returns each morphometric characteristics to DatabaseUpdate.csv where it is stored in NWOutput.csv.

NCRatio.java Pseudocode:
(Nuclear-to-Cytoplasm Ratio Algorithm)
  create an integer array of pixels named pixels using int[ ] pixels=image.getRGB(0, 0, image.getWidth( ), image.getHeight( ), null, 0, image.getWidth( ));
  create a counter integer variable;
  set a threshold from ThresholdA.java;
  obtain the location of the nucleus using the nucleus detection algorithm;
  using Threshold A.java data and Threshold B.java, identify significant transitions that are associated with the background to cytoplasm transition and the cytoplasm to nucleus transition;
  cross-check both the nucleus pixels and cytoplasm pixels identified with the canny edge detector; and
  divide the count of nucleus pixels by the count of cytoplasm pixels to return the nucleus-to-cytoplasm ratio CannyEdgeDetector.java Pseudocode:
(Some embodiments apply this existing method to the present invention.)
  Apply Gaussian filter to smooth the image in order to remove the noise;
  Find the intensity gradients of the image;
  Apply non-maximum suppression to get rid of spurious response to edge detection;
  Apply double threshold to determine potential edges;
  Track edge by hysteresis; and Finalize the detection of edges by suppressing all the other edges that are weak and not connected to strong edges.

ThresholdA.java Pseudocode:

create an integer array of pixels named pixels using int[ ] pixels=image.getRGB(0, 0,image.getWidth( ), image.getHeight( ), null, 0, image.getWidth( ));

create variables for the image width, length and the red, green, blue, hue, saturation, and brightness values of each pixel in the input image;

identify the pixel(s) where the maximum brightness value is at and identify the pixel(s) where the minimum brightness is at;

create an integer named LastPixels and an arraylist of integers named counts;

count all pixels with brightness values between the minimum brightness and hexadecimal 0.005f (a decimal value of 95) above the minimum brightness. Add this count to the arraylist counts;

create an integer variable max slope which identifies the largest slope between 2 brightness values in the arraylist counts;

create a second arraylist of integers that contains the second largest slope between 2 brightness values; and use these values as threshold values in other algorithms to determine the lower bound of different relevant parts of the cell image such as the nucleus and the cytoplasm.

ThresholdB.java Pseudocode:

(Threshold B is similar to the method used in Threshold A but using saturation values.)

create an integer array of pixels named pixels using int[ ] pixels=image.getRGB(0, 0,image.getWidth( ), image.getHeight( ), null, 0, image.getWidth( ));

create variables for the image width, length and the red, green, blue, hue, saturation, and brightness values of each pixel in the input image;

identify the pixel(s) where the maximum saturation value is at and identify the pixel(s) where the minimum saturation is at;

create an integer named LastPixels and an arraylist of integers named counts;

count all pixels with saturation values between the minimum saturation and hexadecimal 0.005f above the minimum saturation. Add this count to the arraylist counts;

create an integer variable max slope which identifies the largest slope between 2 saturation values in the arraylist counts;

create a second arraylist of integers that contains the second largest slope between 2 saturation values; and use these values as threshold values in other algorithms of the present invention to determine the lower bound of different relevant parts of the cell image such as the nucleus and the cytoplasm.

HueThresholdC.java Pseudocode:

(HueThresholdC is similar to the method used in Threshold A but using hue values.)

create an integer array of pixels named pixels using int[ ] pixels=image.getRGB(0, 0,image.getWidth( ), image.getHeight( ), null, 0, image.getWidth( ));

create variables for the image width, length and the red, green, blue, hue, saturation, and brightness values of each pixel in the input image;

identify the pixel(s) where the maximum hue value is at and identify the pixel(s) where the minimum hue is at;

create an integer named LastPixels and an arraylist of integers named counts;

count all pixels with hue values between the minimum hue and hexadecimal 0.005f above the minimum hue. Add this count to the arraylist counts;

create an integer variable max slope which identifies the largest slope between 2 hue values in the arraylist counts;

create a second arraylist of integers that contains the second largest slope between 2 hue values; and use these values as threshold values in other algorithms to determine the lower bound of different relevant parts of the cell image such as the nucleus and the cytoplasm.

RGBThresholding.java Pseudocode:

create an integer array of pixels called pixels using int[ ] pixels=image.getRGB(0, 0, image.getWidth( ), image.getHeight( ), null, 0, image.getWidth( ));

create an integer array of all the pixels with their associated RGB values and a writable raster image of the original. To test different methods, for example, ThresholdA, Threshold B or HueThresholdC, it is possible to turn one set of pixels above the Threshold to white or black and one set of pixels below the threshold to the other color; and output the black-white and/or color pixels from thresholding operation as a visual aid to determine threshold effectiveness and is useful for debugging.

CurvatureDetection.java Pseudocode:

Use the CannyEdgeDetector.java to identify edge pixels and the nucleus to cytoplasm ratio algorithm to cross-match pixel data to determine the edge pixels of the cytoplasm;

Use A Circle Hough Transform (such as described in the paper Kerbyson, D. J., and T. J. Atherton. "Circle detection using Hough transform filters." (1995): 370-374, which is incorporated herein by reference), a Kasa circle-fit method to fit a circle onto the cytoplasm edge pixel data. Both return a center and radius;

Use Houghcirclecheck.java, kasacirclefit.java, FuzzyCMeansImageClustering.java, the cytoplasm edge pixel data and the center and radius of the cell to determine the curvature of the cell; and A common problem that occurs is cytoplasm edge pixels from other cells in the same image interfere with other cell cytoplasm in the same image. To address this problem, use an existing method, Fuzzy C Means Image Clustering to cluster cells together. This method is described in FuzzyCMeansImageClustering.java HoughCircleCheck.java Pseudocode:

(In some embodiments, the present invention applies an existing Hough transform method.) The Hough transform can be used to determine the parameters of a circle when a number of points that fall on the perimeter are known.

Find radius computed by kasacirclefit.java

Using the (now-computed) known radius R, the objective is to find the (a, b) coordinates of the centers using $x=a+R \cos(\theta)$ $y=b+R \sin(\theta)$. The locus of (a, b) points in the parameter space fall on a circle of radius R centered at (x, y).

this gives us the center pixel of the cells.

KasaCircleFit.java Pseudocode:

(In some embodiments, the present invention applies an existing method by Kasa et al. 1976 (e.g., some embodiments implement the circle-fit function using the method described in the paper: Umbach, Dale, and Kerry N. Jones. "A few methods for fitting circles to data." Instrumentation and Measurement, IEEE Transactions on 52.6 (2003): 1881-1885, and/or Chernov, Nikolai, and Claire Lesort. "Least squares fitting of circles." Journal of Mathematical Imaging and Vision 23.3 (2005): 239-252, and/or Rangarajan, Prasanna, and Kenichi Kanatani. "Improved algebraic methods for circle fitting." Electronic Journal of Statistics 3 (2009): 1075-1082, which are all incorporated herein by reference)):

The input is the number of cytoplasm edge pixel data and their x and y coordinates. This Kasa Circle Fit algorithm outputs:
the X-coordinate of the center of the fitting circle, the Y-coordinate of the center of the fitting circle, and
the radius of the fitting circle, the root mean square error (the estimate of sigma), and the total number of iterations.
The method is based on the minimization of the function $F = \text{sum } [(x-a)^2 + (y-b)^2 - R^2]^2$.

FuzzyCMeansImageClustering.java Pseudocode:
(Some embodiments apply to the present invention an existing method and explanation from a paper by Ahmed, Mohamed N.; Yamany, Sameh M.; Mohamed, Nevin; Farag, Aly A.; Moriarty, Thomas (2002). "*A Modified Fuzzy C-Means Algorithm for Bias Field Estimation and Segmentation of MRI Data*". IEEE Transactions on Medical Imaging (21, 3, 193-199). In fuzzy clustering, every point has a degree of belonging to clusters. Points on the edge of a cluster, may be in the cluster to a lesser degree than points in the center of cluster. Any point x has a set of coefficients giving the degree of being in the $k^{th}$ cluster wk(x). With fuzzy c-means, the centroid of a cluster is the mean of all points, weighted by their degree of belonging to the cluster: c_k={{\sum_x{w_k(x)}^{m}x}\over{\sum_x{w_k(x)}^{m}}}. The degree of belonging, wk(x), is related inversely to the distance from x to the cluster center as calculated on the previous pass. It also depends on a parameter m that controls how much weight is given to the closest center. In some embodiments, the algorithm is as follows:
Choose a number of clusters. Assign randomly to each point coefficients for being in the clusters. Repeat until the algorithm has converged;
Compute the centroid for each cluster; and
For each point, compute its coefficients of being in the clusters.

Nucleusdetection.java Pseudocode:
identify the transition RGB values between the background and nucleus using similar methods to ThresholdA.java and ThresholdB.java;
one Threshold will identify the difference between the background (cytoplasm included); use this Threshold in NCRatio.java to find both the cytoplasm and nucleus, and use the other Threshold to identify the difference between the cytoplasm and nucleus;
use a canny edge detector to identify the boundaries of the nucleus (avoid edge pixels in background and cytoplasm) to double check the count of nucleus pixels; and
return the count of nucleus pixels CSVFileReader.java Pseudocode:
(Some embodiments use these existing methods parsing csv (comma-separated variables) files):
create an empty string named FileContents and an ArrayList of strings named storedValues;
use java's BufferedReader method to parse the file into a string FileContents; and
use java's StringTokenizer to populate arraylistList storedValues with the string FileContents but with each line/comma separated value parsed into separate bins within the ArrayList.

Images Obtained Under Different Illumination Spectra:
In some embodiments, individual ones of plurality of LEDs are successively activated to obtain images at each of a plurality of illumination spectra. In some embodiments, such LEDs include ones selected from the following set (data simplified from www.ssi.shimadzu.com/products/literature/uv/VIS/SSI-Pittcon12-UV-001.pdf):
UV361 having a center wavelength of about 363 nm and a FWHM bandwidth of about 13 nm;
UV375 having a center wavelength of about 374 nm and a FWHM bandwidth of about 10 nm;
UV400 having a center wavelength of about 391 nm and a FWHM bandwidth of about 11 nm;
blue having a center wavelength of about 460 nm and a FWHM bandwidth of about 19 nm;
teal having a center wavelength of about 490 nm and a FWHM bandwidth of about 25 nm;
aqua having a center wavelength of about 506 nm and a FWHM bandwidth of about 29 nm;
green having a center wavelength of about 518 nm and a FWHM bandwidth of about 27 nm;
yellow having a center wavelength of about 593 nm and a FWHM bandwidth of about 14 nm;
orange having a center wavelength of about 607 nm and a FWHM bandwidth of about 15 nm;
red having a center wavelength of about 633 nm and a FWHM bandwidth of about 16 nm; and
deep red having a center wavelength of about 653 nm and a FWHM bandwidth of about 21 nm. In some embodiments, infrared LEDs of one or more wavelengths are also included. In some embodiments, one or more digital cameras or imagers having sensitivities at suitable wavelengths are used to capture images of the illumination wavelength (reflected or transmitted) and/or one or more fluorescent wavelengths that are emitted as a result of short-wavelength stimulation.

In some embodiments, the present invention provides a non-transitory computer-readable medium having instructions stored thereon for causing a suitably programmed information processor to execute a method that includes: eliciting and receiving a digital photomicrograph image of cells; determining a boundary of a cell in the image; identifying a plurality of characteristics of the cell from image-pixel data from within the identified boundary of the cell; reading a plurality of cell characteristics of a plurality of types of cells from a database; comparing the identified characteristics of the cells in the image to the plurality of cell characteristics read from the database; and determining a pathology based on the comparing.

Some embodiments of the computer-readable medium further include instructions to cause the method to further include: calculating red-green-blue (RGB) values for a plurality of pixels within the determined boundary of the cell; and determining a first number value for how many of the plurality of pixels within the determined boundary of the cell have a red value greater than a red-threshold value for indication of red blood cells (RBCs) in the image and a green value no more than a green-threshold value for RBCs and a blue value no more than a blue-threshold value for RBCs; and based on the first number value, determining whether to flag the image as possibly indicating hematuria.

In some embodiments of the computer-readable medium, the green-threshold value for RBCs is zero and the blue-threshold value for RBCs is zero.

Some embodiments of the computer-readable medium further include a first matrix containing a plurality of arrays of stored values of a plurality of morphometric characteristics of images of a cell-image database; and further instructions to cause the method to further include: applying one or more feature-detection algorithms to the digital photomicrograph image and storing results thereof into an array of feature-detection results; calculating a plurality of distances including a distance between the array of feature-detection results and each of the plurality of arrays of stored values in the first matrix; and determining which of the calculated plurality of distances is shortest in order to obtain which one of the plurality of arrays of stored values has a highest correlation to the digital photomicrograph image.

Some embodiments further include instructions to cause the method to further include: detecting a curvature of one or more of the cells in the digital photomicrograph image of cells.

Some embodiments of the computer-readable medium further include instructions to cause the method to further include: converting a color of each one of a first plurality of pixels in the digital photomicrograph image of cells to black and converting a color of each one of a second plurality of pixels in the digital photomicrograph image of cells to black based on a histogram of pixel brightnesses.

Some embodiments of the computer-readable medium further include instructions to cause the method to further include: converting a color of each one of a first plurality of pixels in the digital photomicrograph image of cells to black and converting a color of each one of a second plurality of pixels in the digital photomicrograph image of cells to black based on a histogram of changes in pixel-to-neighboring-pixel brightnesses.

Some embodiments of the computer-readable medium further include instructions to cause the method to further include: generating a feedback signal based on the identified characteristics of the cells in the image, and controlling an acquisition of a further image wherein the controlling modifies the acquisition based on the feedback signal.

In some embodiments, the computer-readable medium further include instructions such that the controlling further includes modifying illumination used to acquire the further image.

In some embodiments, the present invention provides a computer-implemented method that includes: eliciting and receiving a digital photomicrograph image of cells; determining a boundary of a cell in the image; identifying a plurality of characteristics of the cell from image-pixel data from within the identified boundary of the cell; reading a plurality of cell characteristics of a plurality of types of cells from a database; comparing the identified characteristics of the cells in the image to the plurality of cell characteristics read from the database; and determining a pathology based on the comparing.

Some embodiments of the method further include calculating red-green-blue (RGB) values for a plurality of pixels within the determined boundary of the cell; determining a first number value for how many of the plurality of pixels within the determined boundary of the cell have a red value greater than a red-threshold value for indication of red blood cells (RBCs) in the image and a green value no more than a green-threshold value for RBCs and a blue value no more than a blue-threshold value for RBCs; and based on the first number value, determining whether to flag the image as possibly indicating hematuria.

In some embodiments of the method, the green-threshold value for RBCs is zero and the blue-threshold value for RBCs is zero.

Some embodiments of the method further include providing a first matrix containing a plurality of arrays of stored values of a plurality of morphometric characteristics of images of a cell-image database; applying one or more feature-detection algorithms to the digital photomicrograph image and storing results thereof into an array of feature-detection results; calculating a plurality of distances including a distance between the array of feature-detection results and each of the plurality of arrays of stored values in the first matrix; and determining which of the calculated plurality of distances is shortest in order to obtain which one of the plurality of arrays of stored values has a highest correlation to the digital photomicrograph image.

Some embodiments of the method further include detecting a curvature of one or more of the cells in the digital photomicrograph image of cells.

Some embodiments of the method further include converting a color of each one of a first plurality of pixels in the digital photomicrograph image of cells to black and converting a color of each one of a second plurality of pixels in the digital photomicrograph image of cells to black based on a histogram of pixel brightnesses.

Some embodiments of the method further include converting a color of each one of a first plurality of pixels in the digital photomicrograph image of cells to black and converting a color of each one of a second plurality of pixels in the digital photomicrograph image of cells to black based on a histogram of changes in pixel-to-neighboring-pixel brightnesses.

In some embodiments, the present invention provides an apparatus that includes: a unit that elicits and receives a digital photomicrograph image of cells; a cell-boundary unit that determines a boundary of a cell in the image; a feature extraction unit that identifies a plurality of characteristics of the cell from image-pixel data from within the identified boundary of the cell; a storage unit that holds a first matrix of a plurality of cell characteristics of a plurality of types of classified cells; a correlation unit that compares the identified characteristics of the cells in the image to the plurality of cell characteristics read from the first matrix; and a pathology-identification unit that determines a pathology based on the comparison.

Some embodiments of the apparatus further include an RGB unit that finds red-green-blue (RGB) values for a plurality of pixels within the determined boundary of the cell; a histogram unit that finds a first number value for how many of the plurality of pixels within the determined boundary of the cell have a red value greater than a red-threshold value for indication of red blood cells (RBCs) in the image and a green value no more than a green-threshold value for RBCs and a blue value no more than a blue-threshold value for RBCs; and a hematuria unit that determines, based on the first number value, whether to flag the image as possibly indicating hematuria.

In some embodiments of the apparatus, the green-threshold value for RBCs is zero and the blue-threshold value for RBCs is zero.

In some embodiments of the apparatus, the first matrix contains a plurality of arrays of stored values of a plurality of morphometric characteristics of images of a cell-image database; a feature-detection unit that applies one or more feature-detection algorithms to the digital photomicrograph image and storing results thereof into an array of feature-detection results; a distance unit that calculates a plurality of distances including a distance between the array of feature-detection results and each of the plurality of arrays of stored values in the first matrix; and an evaluation unit that determines which of the calculated plurality of distances is shortest in order to obtain which one of the plurality of arrays of stored values has a highest correlation to the digital photomicrograph image.

Some embodiments of the apparatus further include a curvature unit that detects a curvature of one or more of the cells in the digital photomicrograph image of cells.

Some embodiments of the apparatus further include an image-simplification unit that converts a color of each one of a first plurality of pixels in the digital photomicrograph image of cells to black and converts a color of each one of a second plurality of pixels in the digital photomicrograph image of cells to black based on a histogram of pixel brightnesses.

Some embodiments of the apparatus further include an image-simplification unit that converts a color of each one of a first plurality of pixels in the digital photomicrograph image of cells to black and converts a color of each one of a second plurality of pixels in the digital photomicrograph image of cells to black based on a histogram of changes in pixel-to-neighboring-pixel brightnesses. It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein. Still further, it is specifically contemplated that the present invention includes embodiments having combinations and subcombinations of the various embodiments described herein and the various embodiments described by the related applications incorporated by reference further above in the present application.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A non-transitory computer-readable medium having instructions stored thereon for causing a suitably programmed information processor to execute a method comprising:

eliciting and receiving a digital photomicrograph image of cells;

determining a boundary of a first cell in the image;

identifying a plurality of characteristics of the first cell from image-pixel data from within the identified boundary of the first cell, wherein the identifying of the plurality of characteristics of the first cell from image-pixel data from within the identified boundary of the first cell further includes:

calculating red-green-blue (RGB) values for a plurality of pixels within the determined boundary of the first cell;

for each respective brightness value of a plurality of brightness values, recording a count of how many pixels have the respective brightness value;

determining an image-specific red-threshold value based on a peak in the recorded counts of pixels at each of the plurality of brightness values; and determining a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs;

reading a plurality of cell characteristics of a plurality of types of cells from a database;

comparing the identified characteristics of the first cell in the image to the plurality of cell characteristics read from the database; and determining a pathology based on the comparing.

2. The computer-readable medium of claim 1, wherein the green-threshold value for RBCs is zero and the blue-threshold value for RBCs is zero.

3. The computer-readable medium of claim 1, wherein the database includes a first matrix containing a plurality of arrays of stored values of a plurality of morphometric characteristics of images; and further instructions to cause the method to further include:

applying one or more feature-detection algorithms to the digital photomicrograph image and storing results thereof into an array of feature-detection results;

calculating a plurality of distances including a distance between the array of feature-detection results and each of the plurality of arrays of stored values in the first matrix; and determining which of the calculated plurality of distances is shortest in order to obtain which one of the plurality of arrays of stored values has a highest correlation to the digital photomicrograph image.

4. The computer-readable medium of claim 3, further comprising instructions to cause the method to further include: detecting a curvature of at least the first cell in the digital photomicrograph image of cells using a Euclidian-distance formula to calculate curvature, wherein the detecting of the curvature of the first cell includes computing a plurality of distances in the first cell, wherein each respective one of the plurality of distances is between a center of a fitted circle associated with the first cell and a respective edge of a plurality of edges of cytoplasm in the first cell, and passing results from the detecting of the curvature for use in the determining of the pathology.

5. The computer-readable medium of claim 3, further comprising instructions to cause the method to further include: converting a color of each one of a first plurality of pixels in the digital photomicrograph image of cells to white and converting a color of each one of a second plurality of pixels in the digital photomicrograph image of cells to black based on a histogram of pixel brightnesses.

6. The computer-readable medium of claim 1, further comprising instructions to cause the method to further include:

based on the first number value, determining whether to flag the image as possibly indicating hematuria.

29

7. A non-transitory computer-readable medium having instructions stored thereon for causing a suitably programmed information processor to execute a method comprising:
eliciting and receiving a digital photomicrograph image of cells;
determining a boundary of a cell in the image;
identifying a plurality of characteristics of the cell from image-pixel data from within the identified boundary of the cell, wherein the identifying of the plurality of characteristics of the first cell from image-pixel data from within the identified boundary of the first cell further includes:
calculating red-green-blue (RGB) values for a plurality of pixels within the determined boundary of the first cell;
for each respective brightness value of a plurality of brightness values, recording a count of how many pixels have the respective brightness value;
determining an image-specific red-threshold value based on a peak in the recorded counts of pixels at each of the plurality of brightness values; and
determining a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs;
reading a plurality of cell characteristics of a plurality of types of cells from a database;
comparing the identified characteristics of the cell in the image to the plurality of cell characteristics read from the database;
determining a pathology based on the comparing; and
converting a color of each one of a first plurality of pixels in the digital photomicrograph image of cells to white and converting a color of each one of a second plurality of pixels in the digital photomicrograph image of cells to black based on a histogram, or the histogram's numerical equivalent data representation, of changes in pixel-to-neighboring-pixel brightnesses.

8. A computer-implemented method comprising:
eliciting and receiving a digital photomicrograph image of cells;
determining a boundary of a first cell in the image;
identifying a plurality of characteristics of the first cell from image-pixel data from within the identified boundary of the first cell, wherein the identifying of the plurality of characteristics of the first cell from image-pixel data from within the identified boundary of the first cell further includes:
calculating red-green-blue (RGB) values for a plurality of pixels within the determined boundary of the first cell;
for each respective brightness value of a plurality of brightness values, recording a count of how many pixels have the respective brightness value;
determining an image-specific red-threshold value based on a peak in the recorded counts of pixels at each of the plurality of brightness values; and
determining a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs;
reading a plurality of cell characteristics of a plurality of types of cells from a database;
comparing the identified characteristics of the first cell in the image to the plurality of cell characteristics read from the database; and
determining a pathology based on the comparing.

9. The method of claim 8, wherein the green-threshold value for RBCs is zero and the blue-threshold value for RBCs is zero.

10. The method of claim 8, wherein the database includes a first matrix containing a plurality of arrays of stored values of a plurality of morphometric characteristics of images, the method further comprising:
applying one or more feature-detection algorithms to the digital photomicrograph image and storing results thereof into an array of feature-detection results;
calculating a plurality of distances including a distance between the array of feature-detection results and each of the plurality of arrays of stored values in the first matrix; and
determining which of the calculated plurality of distances is shortest in order to obtain which one of the plurality of arrays of stored values has a highest correlation to the digital photomicrograph image.

11. The method of claim 8, further comprising:
detecting a curvature of at least the first cell in the digital photomicrograph image of cells using a Euclidian-distance formula to calculate curvature, wherein the detecting of the curvature of the first cell includes computing a plurality of distances in the first cell, wherein each respective one of the plurality of distances is between a center of a fitted circle associated with the first cell and a respective edge of a plurality of edges of cytoplasm in the first cell; and
passing results from the detecting of the curvature for use in the determining of the pathology.

12. The method of claim 8, further comprising:
converting a color of each one of a first plurality of pixels in the digital photomicrograph image of cells to white and converting a color of each one of a second plurality of pixels in the digital photomicrograph image of cells to black based on a histogram of pixel brightnesses.

13. The method of claim 8, further comprising:
based on the first number value, determining whether to flag the image as possibly indicating hematuria.

14. The method of claim 8, wherein the identifying the plurality of characteristics of the cell from image-pixel data from within the identified boundary of the cell further includes:
determining cell curvature,
calculating a nucleus-to-cytoplasm ratio,
quantifying nuclear pigmentation and density parameters, and
characterizing cytoskeleton arrangement.

15. A computer-implemented method comprising:
eliciting and receiving a digital photomicrograph image of cells;
determining a boundary of a cell in the image;
identifying a plurality of characteristics of the cell from image-pixel data from within the identified boundary of the cell, wherein the identifying of the plurality of characteristics of the first cell from image-pixel data from within the identified boundary of the first cell further includes:

calculating red-green-blue (RGB) values for a plurality of pixels within the determined boundary of the first cell;
for each respective brightness value of a plurality of brightness values, recording a count of how many pixels have the respective brightness value;
determining an image-specific red-threshold value based on a peak in the recorded counts of pixels at each of the plurality of brightness values; and
determining a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs;
reading a plurality of cell characteristics of a plurality of types of cells from a database;
comparing the identified characteristics of the cell in the image to the plurality of cell characteristics read from the database;
determining a pathology based on the comparing;
converting a color of each one of a first plurality of pixels in the digital photomicrograph image of cells to white and converting a color of each one of a second plurality of pixels in the digital photomicrograph image of cells to black based on a histogram, or the histogram's numerical equivalent data representation, of changes in pixel-to-neighboring-pixel brightnesses;
applying one or more feature-detection algorithms to the digital photomicrograph image and storing results thereof into an array of feature-detection results;
calculating a plurality of distances including a distance between the array of feature-detection results and each of the plurality of arrays of stored values in a first matrix; and
determining which of the calculated plurality of distances is shortest in order to obtain which one of the plurality of arrays of stored values has a highest correlation to the digital photomicrograph image.

16. An apparatus comprising:
a unit that elicits and receives a digital photomicrograph image of cells;
a cell-boundary unit that determines a boundary of a first cell in the image;
a feature extraction unit that identifies a plurality of characteristics of the first cell from image-pixel data from within the identified boundary of the first cell;
a storage unit that holds a first matrix of a plurality of cell characteristics of a plurality of types of classified cells;
a correlation unit that compares the identified characteristics of the first cell in the image to the plurality of cell characteristics read from the first matrix;
a pathology-identification unit that determines a pathology based on the comparison;
an RGB unit that finds red-green-blue (RGB) values for a plurality of pixels within the determined boundary of the first cell;
a histogram unit that creates a histogram, wherein, for each respective brightness value of a plurality of brightness values, the histogram unit records a count of how many pixels have the respective brightness value, determines an image-specific red-threshold value based on a peak in the histogram of recorded counts of pixels at each of the plurality of brightness values, and finds a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs; and
a hematuria unit that determines, based on the first number value, whether to flag the image as possibly indicating hematuria.

17. The apparatus of claim 16, wherein the green-threshold value for RBCs is zero and the blue-threshold value for RBCs is zero.

18. The apparatus of claim 16, wherein the first matrix contains a plurality of arrays of stored values of a plurality of morphometric characteristics of images of a cell-image database;
a feature detection unit that applies one or more feature-detection algorithms to the digital photomicrograph image and storing results thereof into an array of feature-detection results;
a distance unit that calculates a plurality of distances including a distance between the array of feature-detection results and each of the plurality of arrays of stored values in the first matrix; and
an evaluation unit that determines which of the calculated plurality of distances is shortest in order to obtain which one of the plurality of arrays of stored values has a highest correlation to the digital photomicrograph image.

19. The apparatus of claim 16, further comprising:
a curvature unit that detects a curvature of at least the first cell in the digital photomicrograph image of cells using a Euclidian-distance formula to calculate curvature, wherein the detection of the curvature of the first cell includes computation of a plurality of distances in the first cell, wherein each respective one of the plurality of distances is between a center of a fitted circle associated with the first cell and a respective edge of a plurality of edges of cytoplasm in the first cell, wherein results from the detection of the curvature are passed for use in the evaluation unit.

20. The apparatus of claim 16, further comprising:
an image-simplification unit that converts a color of each one of a first plurality of pixels in the digital photomicrograph image of cells to white and converts a color of each one of a second plurality of pixels in the digital photomicrograph image of cells to black based on a histogram of pixel brightnesses.

21. An apparatus comprising:
a unit that elicits and receives a digital photomicrograph image of cells;
a cell-boundary unit that determines a boundary of a cell in the image;
a feature extraction unit that identifies a plurality of characteristics of the cell from image-pixel data from within the identified boundary of the cell;
a storage unit that holds a first matrix of a plurality of cell characteristics of a plurality of types of classified cells;
a correlation unit that compares the identified characteristics of the cell in the image to the plurality of cell characteristics read from the first matrix;
an RGB unit that finds red-green-blue (RGB) values for a plurality of pixels within the determined boundary of the first cell;
a histogram unit that creates a histogram, wherein, for each respective brightness value of a plurality of brightness values, the histogram unit records a count of how many pixels have the respective brightness value, determines an image-specific red-threshold value based on a peak in the histogram of recorded counts of pixels at each of the plurality of brightness values, and finds a first number value for how many of the plurality of pixels within the determined boundary of the first cell have a red value greater than the image-specific red-threshold value for indication of red blood cells (RBCs) in the image and a green value that is less than or equal to a green-threshold value for RBCs and a blue value that is less than or equal to a blue-threshold value for RBCs;

a hematuria unit that determines, based on the first number value, whether to flag the image as possibly indicating hematuria;

a pathology-identification unit that determines a pathology based on the comparison; and an image-simplification unit that converts a color of each one of a first plurality of pixels in the digital photomicrograph image of cells to white and converts a color of each one of a second plurality of pixels in the digital photomicrograph image of cells to black based on a histogram, or the histogram's numerical equivalent data representation, of changes in pixel-to-neighboring-pixel brightnesses.

* * * * *